(12) United States Patent
Ando

(10) Patent No.: US 10,810,018 B2
(45) Date of Patent: Oct. 20, 2020

(54) DEVICE WITH EXTENSIBILITY

(71) Applicant: OMRON Corporation, Kyoto-shi, Kyoto (JP)

(72) Inventor: Tanichi Ando, Komaki (JP)

(73) Assignee: OMRON Corporation, Kyoto-shi (JP)

( * ) Notice: Subject to any disclaimer, the term of this patent is extended or adjusted under 35 U.S.C. 154(b) by 73 days.

(21) Appl. No.: 16/106,137

(22) Filed: Aug. 21, 2018

(65) Prior Publication Data

US 2018/0357078 A1 Dec. 13, 2018

Related U.S. Application Data

(63) Continuation of application No. PCT/JP2017/009997, filed on Mar. 13, 2017.

(30) Foreign Application Priority Data

Mar. 14, 2016 (JP) .................................. 2016-049438

(51) Int. Cl.
*G06F 1/24* (2006.01)
*G06F 9/445* (2018.01)
(Continued)

(52) U.S. Cl.
CPC ........ *G06F 9/44505* (2013.01); *G06F 16/258* (2019.01); *G06N 3/08* (2013.01);
(Continued)

(58) Field of Classification Search
CPC ... G06F 9/44505; G06F 16/258; G06N 3/126; G06N 3/08; G06N 20/00; G10L 17/00
See application file for complete search history.

(56) References Cited

U.S. PATENT DOCUMENTS

2001/0010074 A1 7/2001 Nishihara et al.
2013/0121620 A1* 5/2013 Suzuki ............... H04N 1/00954
382/307
(Continued)

FOREIGN PATENT DOCUMENTS

EP 3432227 A1 1/2019
EP 3432229 A1 1/2019
(Continued)

OTHER PUBLICATIONS

English translation of the International Search Report of PCT/JP2017/009997 dated Jun. 13, 2017.
(Continued)

*Primary Examiner* — Xuxing Chen
(74) *Attorney, Agent, or Firm* — Metrolex IP Law Group, PLLC

(57) ABSTRACT

A device with extensibility includes an architecture modeled as an ability acquisition model including an ability unit for implementing an ability, an data input unit that is an interface for an input from the ability unit, and a data output unit that is an interface for an output from the ability unit, as an architecture for additionally incorporating a new ability to a basic configuration of the device, and includes an ability setting unit for adding the new ability to the device by setting a function to each of the ability unit, the data input unit, and the data output unit, based on ability providing data including ability setting data, input setting data, and output setting data.

19 Claims, 13 Drawing Sheets

(51) Int. Cl.
*G06N 20/00* (2019.01)
*G06F 16/25* (2019.01)
*G06N 3/12* (2006.01)
*G06N 3/08* (2006.01)
*G10L 17/00* (2013.01)

(52) U.S. Cl.
CPC .............. *G06N 3/126* (2013.01); *G06N 20/00* (2019.01); *G10L 17/00* (2013.01)

(56) References Cited

U.S. PATENT DOCUMENTS

| | | |
|---|---|---|
| 2014/0372354 A1 | 12/2014 | Kaplan |
| 2015/0074028 A1 | 3/2015 | Miyashita |
| 2017/0161603 A1 | 6/2017 | Okanohara et al. |
| 2017/0206464 A1* | 7/2017 | Clayton ............... G06N 3/0454 |

FOREIGN PATENT DOCUMENTS

| | | |
|---|---|---|
| JP | H15-113882 A | 5/1993 |
| JP | 2001-202236 A | 7/2001 |
| JP | 2006-18640 A | 1/2006 |
| JP | 2007-140952 A | 6/2007 |
| JP | 2009-134474 A | 6/2009 |
| JP | 2014-228972 A | 12/2014 |
| JP | 2015-53008 A | 3/2015 |
| JP | 5816771 B1 | 11/2015 |

OTHER PUBLICATIONS

English translation of the Written Opinion of PCT/JP2017/009997 dated Jun. 13, 2017.
Extended European search report dated Mar. 8, 2019 in a counterpart European patent application.
Communication pursuant to Article 94(3) EPC dated Apr. 21, 2020 in the counterpart European patent application.

* cited by examiner

DEVICE WITH EXTENSIBILITY

CROSS REFERENCE TO RELATED APPLICATION

This application is a continuation application of International Application No. PCT/JP2017/009997, filed on Mar. 13, 2017, which claims priority based on the Article 8 of Patent Cooperation Treaty from prior Japanese Patent Application No. 2016-049438, filed on Mar. 14, 2016, the entire contents of which are incorporated herein by reference.

TECHNICAL FIELD

The disclosure relates to technology for adding a new ability to a device.

RELATED ART

Research on artificial intelligence and neural networks has been widely performed for many years. For example, object recognition technology using images has advanced in many ways, and the recognition rate has been increasing gradually. With a new learning method called "deep learning", the recognition rate has rapidly increased in recent years, and the recognition rate regarding image classification has almost reached a level that exceeds the recognition rate of humans. Deep learning technology is applicable to a wide variety of fields including not only image recognition, but also voice recognition, personal authentication, behavior prediction, text summarization, automatic translation, surveillance, autonomous driving, fault prediction, sensor data analysis, music genre determination, contents generation, security systems, and the like. Machine learning such as deep learning enables machines to acquire new abilities (skills), without humans being involved.

At present, AI technology such as deep learning is special technology. Accordingly, research and development by workers having special skills are required for applying AI technology to a specific field. For example, workers who have AI technology analyze the hardware and the needs of a client for each request from the client, create a learning plan, construct a training system, generate a new neural network through the learning, and develop a system for incorporating the new neural network into the client's system. In the learning using AI technology such as deep learning, a large volume of data is needed in many cases, furthermore, the number of times repeated computation is performed is large, and thus a large-scale training system is required. In the training system, in addition to implementation of AI technology, more complicated systems that are different from conventional web applications, such as constructing a mechanism for handling a large volume of data, parallelizing, and incorporating computation programs into hardware, are used. In the current situation, AI technology service companies that own AI technology undertake both consulting and system development from client companies that are unfamiliar with AI technology.

As technology relating to a method for implementing a new ability to a device, Patent Document 1 and Patent Document 2 disclose technology of rewriting printer firmware. Also, Patent Document 2, and Patent Document 4 disclose technology associated with machine learning, and Patent Document 5 discloses a character identification system using deep learning.

RELATED ART DOCUMENTS

Patent Documents

Patent Document 1: JP 2009-134474A
Patent Document 2: JP 2007-140952A
Patent Document 3: JP 2014-228972A
Patent Document 4: JP 5816771B
Patent Document 5: JP 2015-53008A

SUMMARY OF THE INVENTION

Problem to be Solved by the Invention

In the future, demands that companies that develop devices wish to develop products incorporating AI technology by themselves will increase. Especially, there are many such demands for incorporated equipment. However, machine learning (training) requires an advanced system, many computation resources, and workers who can maintain them. For this reason, it is not easy for engineers of general manufacturers to implement machine learning by themselves. For this reason, outsourcing of machine learning is conceivable, but for engineers who are unfamiliar with AI technology, for example, such as developers of incorporated equipment, it is not easy to incorporate the results of the machine learning performed externally into their own devices.

Also, sequence control is used for many devices and facilities from household equipment to industrial equipment and infrastructure facilities. However, artificial intelligence as represented by a neural network is not suitable for sequence control, and it is difficult with current technology to acquire operations performed by complicated sequence control through machine learning. Accordingly, for applying machine learning to a device that uses sequence control, it becomes important how to incorporate (how to coordinate) the functions obtained by machine learning in a sequence control portion that operates with a program created by a person (an engineer).

One or more aspects have been made in view of the above circumstances, and may provide a structure in which even a person who has no knowledge and a system relating to machine learning can easily add a new ability to his or her device.

Means for Solving the Problems

To achieve any of the above-mentioned objects, one or more embodiments employ the following configuration.

One or more embodiments may be a device with extensibility including: as an architecture for additionally incorporating a new ability to a basic configuration of the device, an architecture that is modeled as an ability acquisition model that includes an ability unit configured to implement an ability, a data input unit that is an interface for an input from the ability unit, and a data output unit that is an interface for an output from the ability unit; and an ability setting unit configured to add the new ability to the device by setting a functionality of each of the ability unit, the data input unit, and the data output unit, based on ability providing data including ability setting data, input setting data, and output setting data.

According to one or more embodiments, incorporating of a new ability to the device can be easily realized, by installing an architecture that is modeled as the ability acquisition model and the ability setting unit that sets the functions to constituent units of the ability acquisition model based on the ability providing data. In this manner, a device with excellent extensibility having a mechanism for easily adding a new ability provided from the outside can be provided. In addition, it becomes easy to outsource the development of the new ability, which can improve the efficiency of development work.

The basic configuration may include a sequence control unit configured to operate with sequence control. In this manner, the extensibility for the device that operates with the sequence control can be increased. The data input unit may have, for example, a function of importing data from the basic configuration based on a control signal from the sequence control unit, and the data output unit may have a function of outputting data to the sequence control unit. In this manner, the new ability added by the ability acquisition model can be implemented under the control of the sequence control unit. Also, the data and processing results can be delivered between a function provided from the basic configuration and an added new function, and cooperation (coordination) of basic functions and the added new function can be easily realized.

The ability providing data includes operation confirmation data, and the ability setting unit may confirm, using the operation confirmation data, whether the added new ability correctly operates, after the function is set for each of the ability unit, the data input unit, and the data output unit based on the ability providing data. In this manner, the operation confirmation for confirming whether the new ability is successfully incorporated can be easily and automatically performed, which increases user-friendliness. The operation confirmation data includes, for example, one or more pieces of input data and determination information for determining whether data, which is processed in the ability unit when the input data is received by the data input unit, is data to be output from the data output unit, and the ability setting unit may confirm, using the determination information, whether the added new ability correctly operates by determining data output from the data output unit, which is obtained by the input data being received by the data input unit. In this manner, the series of operations by the data input unit, the ability unit, and the data output unit can be confirmed.

The ability setting data may be data for setting, in the ability unit, a function of implementing the new ability, the input setting data may be data for setting a function relating to an interface for an input received by the ability unit to the data input unit, and the output setting data may be data for setting a function relating to an interface for an output from the ability unit to the data output unit.

The function relating to the interface for the input to the ability unit may include at least one of a function of importing data from the basic configuration to the data input unit, a function of importing data from another device to the data input unit, a function of processing the imported data, and a function of converting a data format so as to make it compatible with the ability unit. These functions can provide the data necessary for implementing a new ability to the ability unit.

The function relating to the interface for the output from the ability unit may include at least one of a function of processing the data that is output from the ability unit, a function of converting the data format so as to make it compatible with the basic configuration, and a function of converting the data format so as to make it compatible with the other device. These functions can output a result of the new ability implemented by the ability unit in a desired format.

The architecture may be constituted by a rewritable electronic circuit, and the ability providing data may include data that is written in the rewritable electronic circuit. In addition, the architecture may be constituted by a processor for executing a program, and the ability providing data may include a program that is executed by the processor. Providing a mechanism for providing an ability with the above configuration makes it easy to add a new ability to the device.

The new ability may be an ability acquired through machine learning. Because machine learning requires an advanced system, many computation resources, and workers who can maintain them, it is sometimes difficult for developers of devices to perform machine learning by themselves. In such cases, a highly convenient service that another person performs machine learning and delivers the learning result in the form of ability providing data can be realized by using the device with extensibility according to one or more embodiments.

Note, a device with extensibility that includes only some of the above-mentioned configurations or functions can also be regarded as being in accordance with one or more embodiments. The device with extensibility may be constituted by a single device, but may also be constituted by a combination of multiple devices. Also, one or more embodiments can be regarded as a method including at least a part of the above-mentioned processing, or a program for causing a computer to execute the method, or a computer-readable recording medium in which such a program is recorded in a non-transitory manner. One or more embodiments can be configured by combining the above configurations and various processing, as long as technical inconsistencies do not occur.

Effects of the Invention

According to one or more embodiments, a mechanism that improves the efficiency of development work for adding a new ability to a device can be provided. Also, according to the present invention, a device with excellent extensibility having a mechanism for easily adding a new ability provided from the outside can be provided. Furthermore, according to one or more embodiments, a mechanism for adding a new ability acquired by machine learning to a device that uses sequence control can be provided.

EMBODIMENTS OF THE INVENTION

Figure 1:
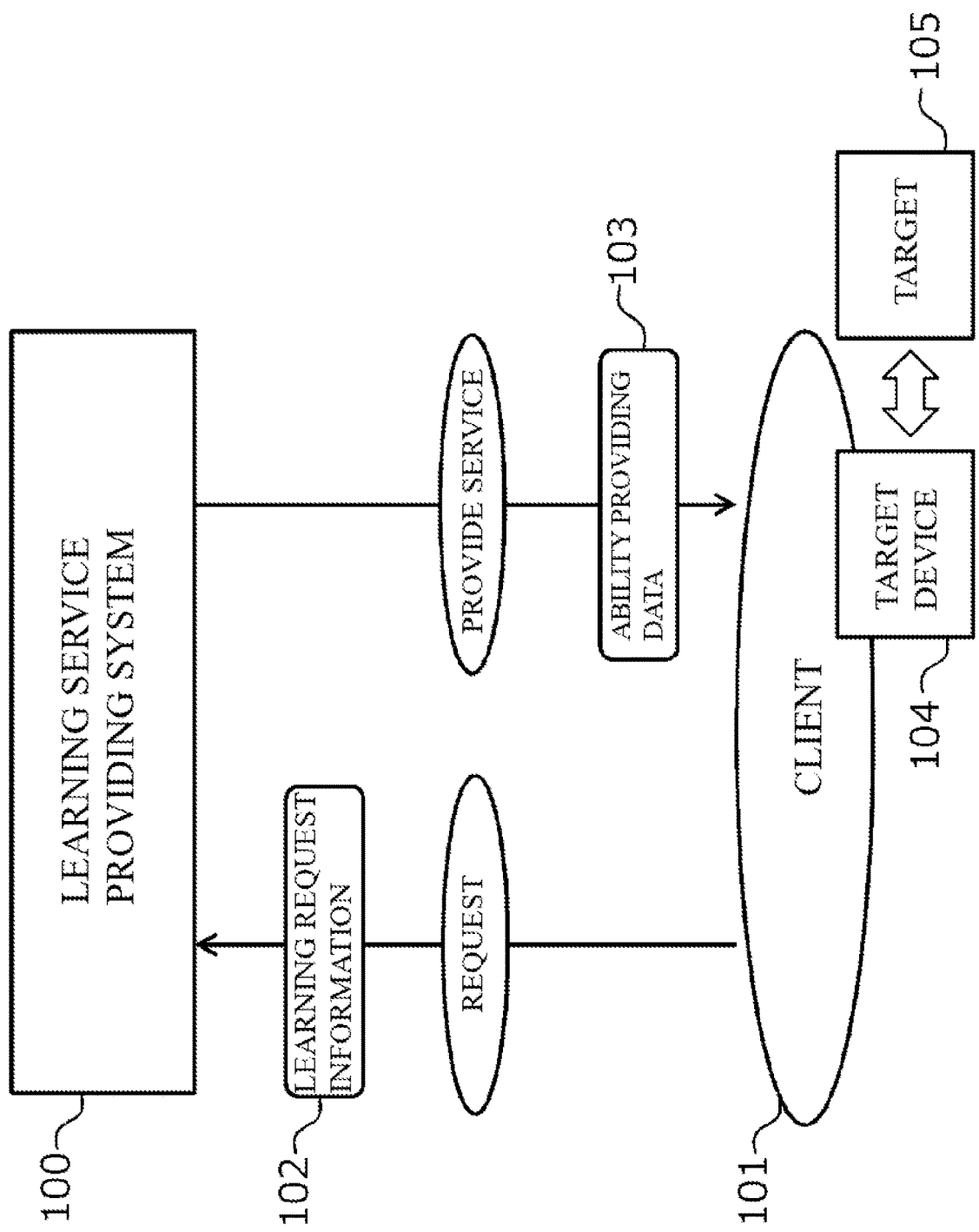
FIG. 1 is a conceptual diagram illustrating a learning service that a learning service providing system provides.

One or more embodiments relate to a device with excellent extensibility, which has an architecture that can add a new "ability" acquired through machine learning. In this specification, a device having such an extensibility is referred to as "device with extensibility" or "device with extensible design". In the embodiments mentioned below, examples are described in which a client incorporates a new ability into its own device with extensibility (hereinafter referred to as "target device", in the meaning of a device to which a new ability is to be added) by using an external learning service.

Explanation of Terms

Before the description of embodiments, terms that are used in this specification will be explained.

A "learning service" is a service that performs machine learning on behalf of someone else. Specifically, it is a service, based on a request from a client (a person who wishes to add a new ability to a target device), in which machine learning of the new ability to be added to the target device is performed on behalf of the client, and the "ability" that is acquired as the result of the machine learning is provided to the client's target device. "Learning service providing system" is a system that performs the series of processing relating to the learning service, such as accepting the learning request from the client, performing the machine learning, and providing the learning result to the client.

"Machine learning" means that, when an objective is input to a machine, the machine acquires an ability to achieve the objective, and can exhibit the newly acquired ability. In this specification, unless otherwise specified, "learning" means machine learning.

"Ability" is a function that the device can provide, or processing that the device can execute. Adding a new ability to a device means adding a new function or processing to the device, or improving the performance of the function or processing that the device already has. Note, that the "target device" of the client may be any type of device, as long as the device has a configuration in which the new ability can be added. The ability can be used for the devices in various fields such as manufacturing devices, FA robots, inspection devices, production management systems, plant control systems, surveillance systems, building control systems, store management systems, humanoid robots, disaster prevention robots, Web services, mobile terminals, home appliances, business systems, incorporation systems, biological information systems, image recognition devices, audio recognition devices, autonomous driving systems, fault prediction systems, data analysis devices, contents generation devices, security systems, financial systems, and virus surveillance devices.

"Ability providing data" is data for adding an "ability" that is acquired as the learning result to the target device of the client. The ability providing data has a data format that can be incorporated (implemented) in the target device of the client as it is. Converting the learning result into data in an appropriate format makes it easy to incorporate the learning result of the learning service into the target device of the client.

In the embodiments mentioned below, to distinguish an executable program from the definition of the program, the definition of the program is referred to as "model". A "model" is a generalization/abstraction of the behavior and properties of a target, which is expressed using a predetermined coding language, and is the same as a model used in model-based development. Any program and data structure can be defined with a model. Any device, environment, physical phenomenon can also be defined with a model. In model-based development, the inner structures of constituent elements and the relationships between the constituent elements are defined for each model, and the state in which multiple models are combined can be simulated. Also, an executable program and a circuit can be automatically generated from a model by using model-based development tools.

Not only the definition of a model but also an executable program can be included in a model. In this manner, the processing performed when a requested learning is executed by the learning simulator can be reduced.

In the embodiments mentioned below, the relationships between the parts of the learning simulation can be clearly defined, by developing the program with the model-based development tools. Note, that equivalent programs can also be developed without using model-based development tools to implement a system. Accordingly, one or more embodiments are not limited to systems that are developed by model-based technology.

Some of the items listed in a model can be "parameterized". That is, defining the values of the items as parameters (variables) makes it possible to cause the client to input or select the parameter values when the learning request is accepted, or to appropriately set the parameter values on the system side at the time of learning execution. Hereinafter, a parametrized item is referred to as "parametric item" or "undefined item", or simply as "parameter". On the other hand, an item whose values and content are defined is referred to as "constant item" or "defined item". Parametric items are not limited to data items. A processing item (method item) can also be, for example, parameterized by using a functional programming language. A functional programming language can pass on a function as an argument of the function. With this function, a predetermined program is handled as the argument of another program, and can be activated. Specifying ID information of a different function (program) as the argument of the function parameterizes the processes that can be selected. This increases the amount of code, but similar processes can thus be written in a general object-oriented language or the C language.

A "learning model" is a model in which a method for acquiring new ability to be added to the target device through machine learning is formulated. The learning model is created for each type of machine learning for which this system can accept the request. In the description below, there are contexts in which the word "learning model" is merely used as "type of machine learning".

A "target device model" is a model of the target device of the client (the device to which the new ability is added). The present system generates and creates ability providing data so as to be executed in this target device model.

A "target model" is a model of a target with which the target device of the client (the device to which a new ability is added) has a relationship. The target with which the target device has the relationship corresponds to, for example, the environment surrounding the target device, another device for inputting/outputting with the target device, and the target affected by the target device.

Operation Concept of Overall System

FIG. 1 is a conceptual diagram of learning service provided by a learning service providing system of one or more embodiments. A client 101 accesses a learning service providing system 100 via a network such as the Internet, and requests machine learning of an ability to be added to a target device 104. Necessary information for performing the machine learning is provided, as learning request information 102, to the learning service providing system 100 from the client 101. The learning service providing system 100 performs necessary machine learning while simulating a target device 104 and a target 105 of the client 101, based on the learning request information 102 provided from the client 101. After the learning that was requested from the client 101 has been completed, the learning service providing system 100 provides, to the client 101, the new ability that is acquired as the learning result, as ability providing data 103 in a data format that can be incorporated in the target device 104. Note, that the client 101 may also access the learning service providing system 100 using a personal computer, or may also directly access the learning service providing system 100 from the target device 104 if the target device 104 can access the Internet.

System Configuration

Figure 2:
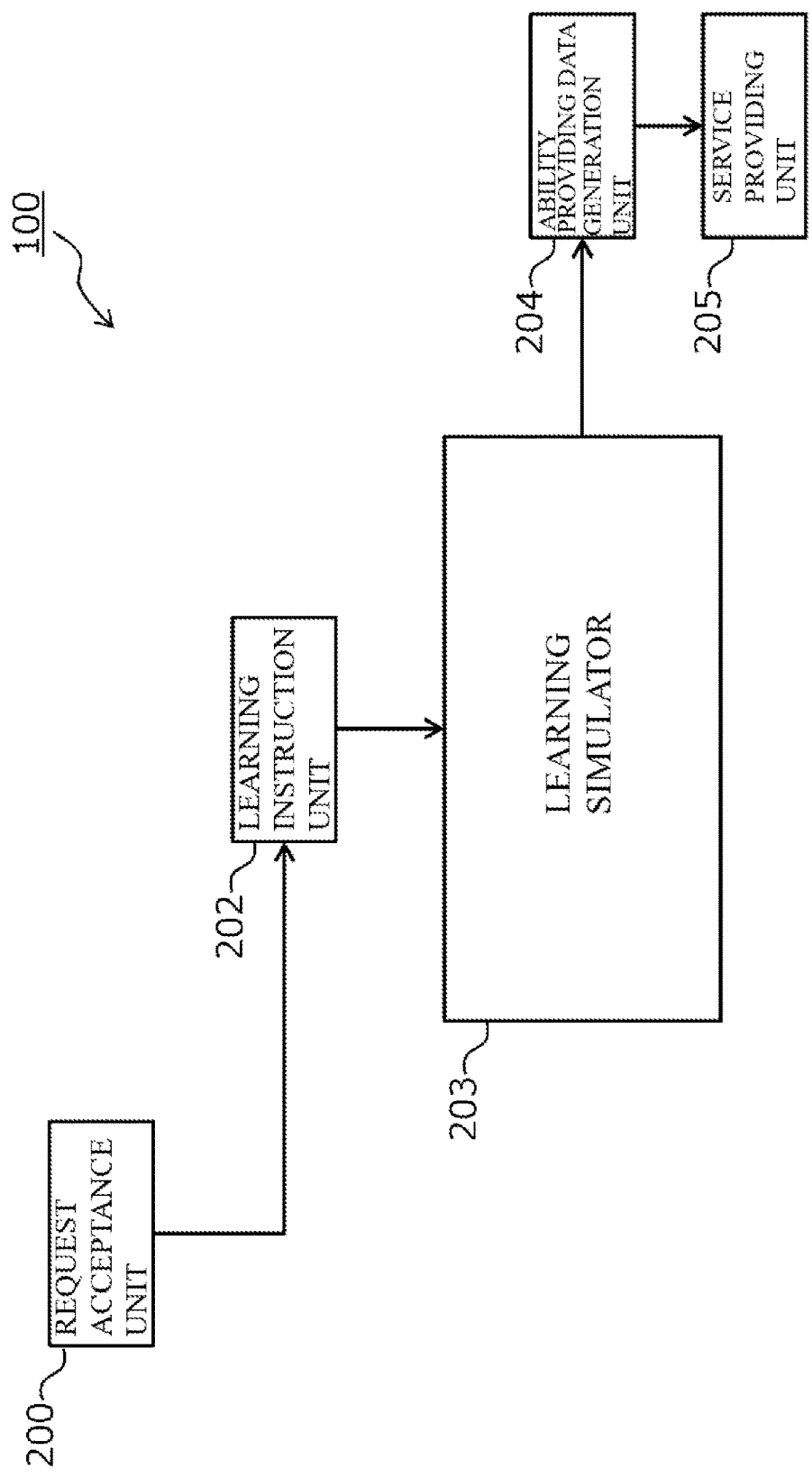
FIG. 2 is a system configuration diagram illustrating a learning service providing system.

FIG. 2 is a system configuration diagram of the learning service providing system. The learning service providing system 100 includes a request acceptance unit 200, a learning instruction unit 202, a learning simulator 203, an ability providing data generation unit 204, and a service providing unit 205.

The system 100 is constituted by, for example, a general computer having hardware resources such as a processor, a memory, a storage device (a hard disk, a semiconductor disk, or the like), an input device (a keyboard, a mouse, a touch panel, and the like), a display device, and a communication device. Functions of the system 100 shown in FIG. 2 may be realized by a program stored in the storage device being loaded to the memory and executed by the processor. Note, that the system 100 may be constituted by one computer or by distributed computing executed by multiple computers. In addition, for speeding up the processing, some or all of the functions of the system 100 can be realized by using dedicated hardware (e.g., a GPU, a FPGA, an ASIC, or the like).

Acquiring an Ability

To provide this learning service to various types of target devices 104, the architecture for incorporating (embedding) a new ability in the target device 104 needs to be standardized. In one or more embodiments, the architecture for incorporating a new ability in the target device 104 is modeled accordingly as an "ability acquisition model". By the target device 104 providing an incorporation interface that is in accordance with the ability acquisition model, and the learning simulator 203 of the system 100 performing machine learning so as to acquire the ability that matches the ability acquisition model, the ability providing data 103 generated by the system 100 can be incorporated into the target device 104.

Information relating to the architecture to be standardized is converted into data as model data, by defining the ability acquisition model. The information relating to the ability acquisition model converted into data is used for logically matching the learning simulator 203 with the target device 104 in each of the learning models. By converting the information into data, programs and circuits can be automatically generated and tested using various kinds of development tools.

If a prepared ability acquisition model does not conform to the target device 104, a new ability acquisition model may also be created, by some or all of the prepared ability acquisition model being altered by the client 101 of the learning. Learning can be requested for any target device 104, by describing the ability acquisition model in a system modeling language, storing the language into a file, and including the language into the learning request information 102 to be provided to the learning service providing system 100.

By providing identifying information (for example, an ability acquisition model ID or an ability acquisition model name) for mutually distinguishing the ability acquisition models from each other, the learning simulator 203 can be logically matched to the target device 104 by specifying the ability acquisition model using the identifying information.

A client 101 who requests learning and a person who receives the request can proceed with their own development without exchanging more technical information than needed, by using the ability acquisition model.

Presenting information of the ability acquisition model to the public can help the dissemination of a product that is a target device 104 corresponding to the specific ability acquisition model that has been presented (made open) to the public. Also, learning models that correspond to a specific ability acquisition model that has been presented to the public can be provided from multiple vendors, thus increasing the learning level through competition can be expected.

Figure 3:
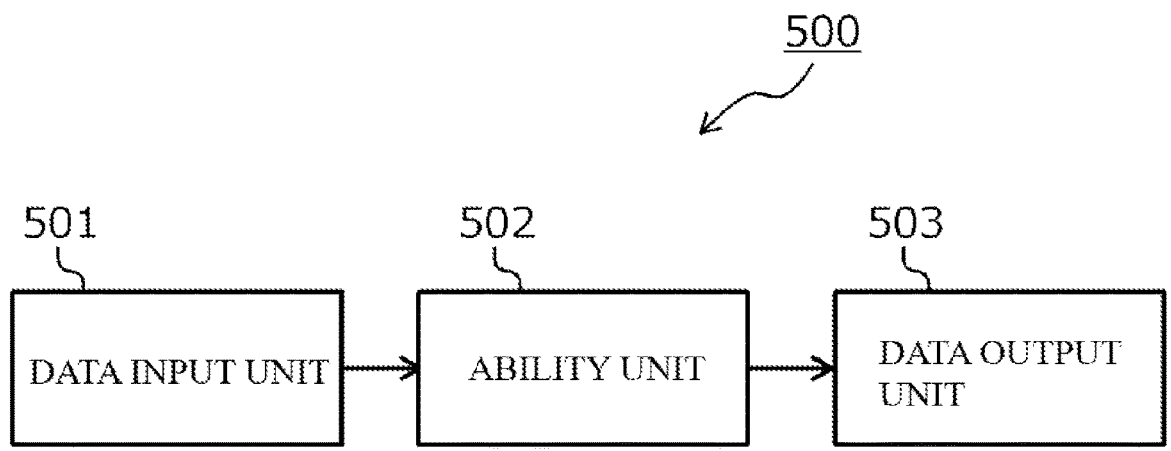
FIG. 3 is a configuration diagram illustrating an ability acquisition model.

FIG. 3 shows the configuration of the ability acquisition model. An ability acquisition model 500 of one or embodiments includes three definitions: an ability unit 502 configured to perform an ability, a data input unit 501 that is an interface for an input to the ability unit 502, and a data output unit 503 that is an interface for an output from the ability unit 502. The data input unit 501 receives data with a predetermined specification from the target device 104 or another apparatus, converts the data format so as to be compatible with the ability unit 502 by performing the necessary data processing on the data, and inputs the data. The data input unit 501 includes the definitions of the specifications (formats) for inputting data to the ability unit 502 from the target device 104 or other apparatuses, such as the specification (format) of data that is received from the target device 104 or the like, and the specification (format) of data that is received by the ability unit 502. The ability unit 502 performs information processing based on the data that is input from the data input unit 501, and outputs the result of the information processing to the data output unit 503. The ability of the ability acquisition model 500 can be changed by changing the inner configuration of this ability unit 502. The data output unit 503 receives the result from the ability unit 502, converts the data format so as to be compatible with the target device 104 or another apparatus by performing the necessary data processing on the result, and outputs the data. The data output unit 503 includes the definitions of the specifications for outputting the data to the target device 104 or the other apparatus from the ability unit 502, such as the specification of the data that is output from the ability unit 502, the specification of the data processing, and the specification of the data that is output to the target device 104 or the like with a predetermined interface specification.

By using the ability acquisition model 500, it is guaranteed that the data input units 501, the ability units 502, and the data output units 503 of the learning simulator 203 and the target device 104 operate in the same logical manner, even if their implementations differ. Also, by using the ability acquisition model, learning can be requested without exchanging more information than needed between the client of the learning and the person who receives the request.

Figure 7:
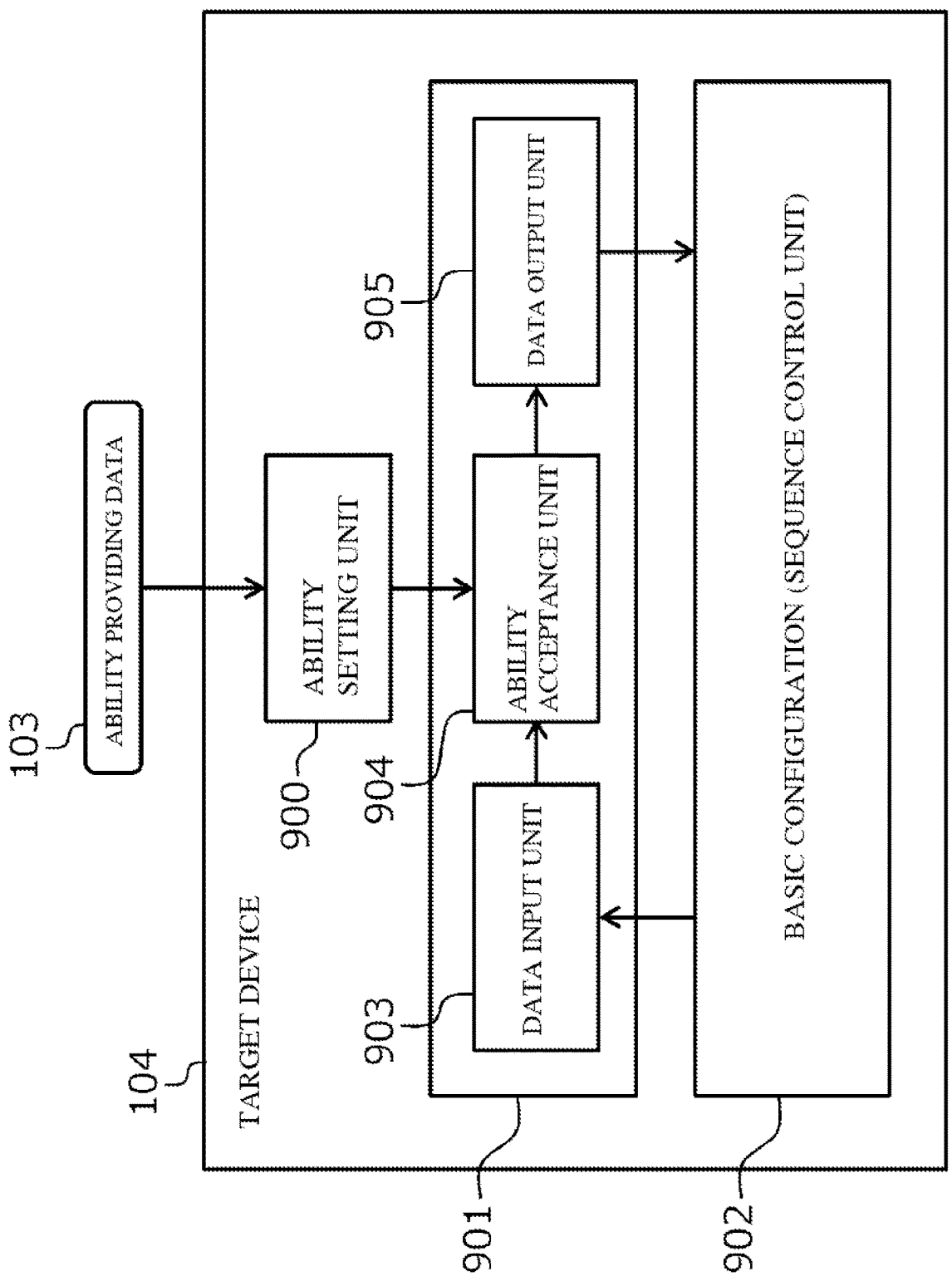
FIG. 7 is a configuration diagram illustrating a target device.
Figure 9:
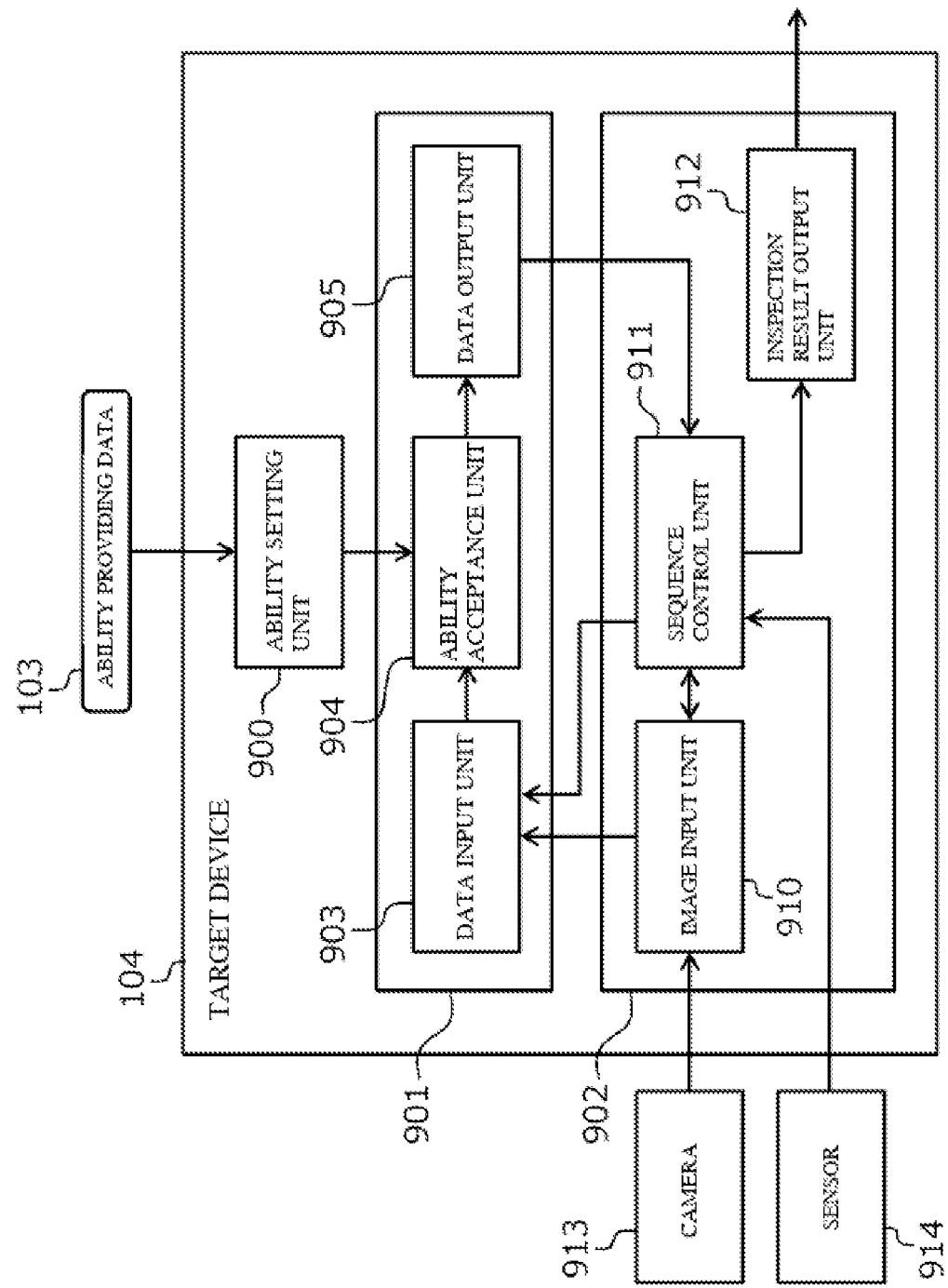
FIG. 9 is a configuration diagram illustrating a target device for processing images.

Because the learning simulator 203 of the system 100 uses the ability acquisition model 500 for learning simulation to acquire a new ability, in the description below, the ability unit 502 of the system 100 is also referred to as "ability acquisition unit" (see ability acquisition unit 1004 in FIG. 11). On the other hand, because the target device 104 uses the ability acquisition model 500 for accepting and implementing the new ability that are acquired in the system 100, the ability unit 502 of the target device is also referred to as "ability recipient unit" (refer to an ability recipient unit 904 shown in FIG. 7). Also, in the description below, to distinguish the ability acquisition model of the learning simulator 203 from the ability acquisition model of the target device 104, the reference numbers shown in FIGS. 7 and 9 are used.

For enabling an ability acquired in the learning simulator 203 to be provided to the target device 104, the ability acquisition model 500 may include at least an interface specification for an interface between the data input unit 501 and the ability unit 502, an interface specification for an interface between the ability unit 502 and the data output unit 503, and information for specifying the configuration of the ability recipient unit 904 of the target device 104 when the learning model is used for learning. If an ability to be acquired is "classification of images", for example, the relationship between the target device 104 and the ability acquisition model is simple, thus the learning simulator 203 and the target device 104 can be matched only with the interface specifications and the information. Specifically, it is sufficient that it is defined that the input is an image data and the output is a classification result.

The ability acquisition model 500 can be configured to further include the following detailed information.

The data to be received by the ability acquisition unit 1004 that is implemented in the learning simulator 203 needs to be the same as the data to be received by the ability recipient unit 904 of the target device 104. The data input unit 501 of the ability acquisition model 500 can be configured to include information for defining the interface specification of a data input from a basic configuration 902 of the target device 104 to a data input unit 903. Any logic can be incorporated in the data input unit 501.

If deep learning is used for learning, the ability recipient unit 904 is the deep neural network that is also used in the learning model, and thus the ability acquisition model 500 needs to include information for specifying the configuration of a network on which the ability can be imparted. The information for specifying the configuration may also uniquely define a network on which the ability can be imparted, or may also indicate multiple selectable ranges. In the case of other learning methods, the ability acquisition model 500 is configured to include information for identifying a learning logic such as a circuit or software for acquiring an ability. In this configuration, it is guaranteed that the logical configurations of the ability acquisition unit 1004 of the learning simulator 203 and the ability recipient unit 904 of the target device 104 correspond to each other. On the other hand, the implementation methods of the ability acquisition unit 1004 of the learning simulator 203 and the ability recipient unit 904 of the target device 104 may differ, for example, in their hardware implementation and software implementation. When the ability recipient unit 904 of the target device 104 is implemented by software, for example, in the learning simulator 203, the neural network of the ability acquisition unit 1004 can be constituted by hardware, thus shortening the learning time.

The data that is output, via a data output unit 1005, from the ability acquisition unit 1004 implemented in the learning simulator 203 needs to be the same as the data that is output, via a data output unit 905, from the ability recipient unit 904 of the target device 104. Accordingly, the data output unit 503 of the ability acquisition model 500 can include information that defines the interface specification of a data output from the data output unit 905 to the basic configuration 902 of the target device 104.

Defining the interface specifications of the input and output between the ability acquisition model 500 and the basic configuration 902 of the target device 104 enables the learning simulator 203 to perform a simulation using a model 1006 of the basic configuration 902. If the acquired ability controls the basic configuration 902 of the target device 104, for example, the above-mentioned detailed information is needed.

The ability acquisition model 500 may also include circuit information or an executable program for implementing the learning simulator 203 or implementing the target device 104. Conversely, it is also possible to define only a minimum interface specification. Defining only the minimum interface makes it possible to reduce a size of the file that defines the ability acquisition model 500. By including the interface specification and the implemented logic, it is also possible to automatically generate the ability acquisition model 500 from a model for each of the learning simulator 203 and the target device 104. By automatically generating the ability acquisition model 500, the development efficiency of the learning model can be increased, and thus a strict specification check performed using model information can be automatically implemented.

It is sufficient that the ability acquisition model 500 is defined without contradiction between the learning simulator 203 and the target device 104 in each learning model. The implementation of the portions corresponding to the ability acquisition model 500 in the learning simulator 203 and the target device 104 may be different from each other.

The ability acquisition model 500 can be defined, for example, by a language function of an abstract class, or an equivalent class that defines the interface of an object-oriented programming language or functional programming language. Furthermore, implementation classes can be added. Alternatively, the ability acquisition model 500 can be defined as an interface specification by using a system modeling language. The ability acquisition model 500 can be defined so as to include an implemented logic using the system modeling language. Alternatively, the ability acquisition model 500 can be defined as an interface specification of a hardware coding language. The ability acquisition model 500 can be defined so as to include the implemented logic using the hardware coding language.

In each case, it is possible to define only the interface specification, or to include the definitions of the logics that are implemented corresponding to the data input unit 501, the ability unit 502, and the data output unit 503.

The data input unit 1003 and the data output unit 1005 in the learning simulator 203 respectively inputs and receives data, to and from the ability acquisition unit 1004, that is equivalent to the data that is input to the data input unit 903 and is output from the data output unit 905 in the target device 104 as data for learning. Because it is sufficient that data equivalent to the data of the target device 104 is input to the ability acquisition unit 1004, the data input unit 1003 and the data output unit 1005 in the learning simulator 203 and the data input unit 903 and the data output unit 905 in the target device 104 do not necessarily have the same configuration. If the format of the data used for learning and the output data format differ from the data format handled in the target device 104, the data format may be converted such that the interfaces between the data input unit 1003 and the data output unit 1005 in the learning simulator 203 and the ability acquisition unit 1004 correspond to each other. By matching ability acquisition models between the learning simulator 203 and the target device 104, it is guaranteed that the ability acquisition unit 1004 and the ability recipient unit 904 of the target device 104 at the time of learning can execute equivalent abilities and that equivalent data is input to and output from each of the units. In addition, incorporating a new ability to the target device 104 can easily be realized with the ability providing data 103. If the ability acquisition models are matched, abilities can be provided by the ability providing data 103, even if the implementation forms of the ability acquisition unit 1004 in the learning simulator 203 and the ability recipient unit 904 in the target device 104 are different (for example, hardware implementation and software implementation, or differences in the used programming language).

The ability (programs for realizing information processing and various types of parameters, etc.) that the ability unit 502 exhibits is generated through machine learning. Machine learning can be implemented using technology for deep learning (in the following embodiments, mainly, implementation using deep learning is assumed.) Note, that the learning method is not limited to deep learning.

To learn motor control, for example, a new ability can be acquired through the following method. Multiple configuration elements of control logics are prepared. Some of the configuration elements are randomly selected and connected through training. The result is optimized by a genetic algorithm with the connected model. This is repeated over a predetermined range, and the best result is selected.

To learn the classification of character strings, for example, a new ability can be acquired through the following method. Many samples of classification of character strings performed by a person are prepared. Various kinds of string functions are prepared. String functions are randomly selected, and multiple string functions are combined. Parameters of the combined string function are optimized by a genetic algorithm. This is repeated over a predetermined range, and the best parameters are selected.

By generating a machine code of a program for each part, and selecting the machine code with which the output with respect to the input becomes the best, a new ability can be acquired. The learning speed can be increased by appropriately selecting the division of the program for each purpose.

An AI engineer selects an efficient ability acquisition model and a training method when receiving each request so that the request for learning can be accepted. Various approaches have been known as learning methods for deep learning. For each target to be applied, the AI engineer selects such a method that learning finishes with less processing.

Example of Deep Learning

Figure 4:
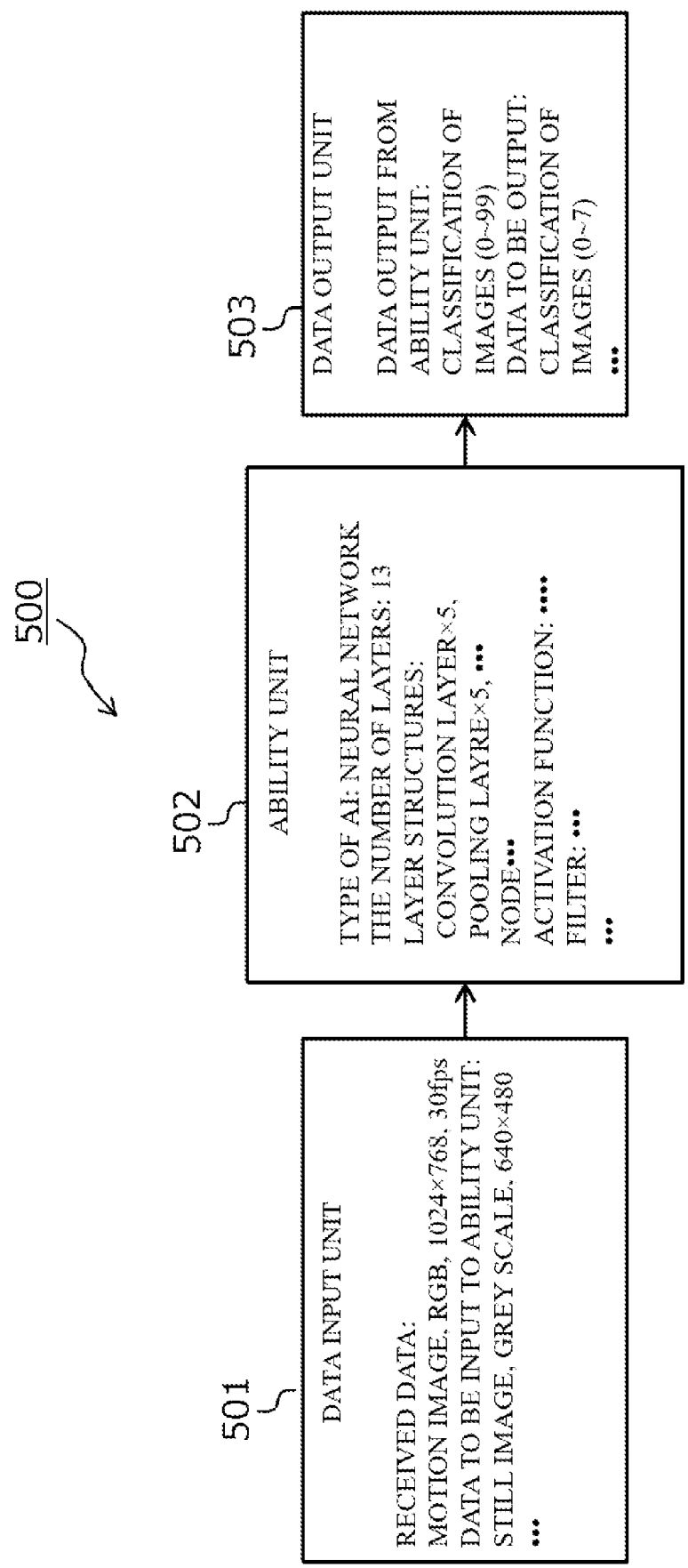
FIG. 4 is a diagram illustrating an example of an ability acquisition model by deep learning.

FIG. 4 is a diagram showing an example of the ability acquisition model by deep learning. The data input unit 501 is a function block that converts a signal format that is input to the target device 104 so as to be compatible with the neural network and inputs the signal that has been converted into data. In the data input unit 501, for example, "moving image, RGB, resolution 1024×768, 30 fps" as a specification of data that is received from the target device 104, and "still image, grey scale, resolution 640×480" as a specification of data that is input to the ability unit 502 are defined. If color information is unnecessary, converting the data into gray scale shortens the learning time and simplifies the circuit configuration of the ability unit 502. This is an example of converting the data format, it is also possible to input RGB color signals as they are if color information is necessary. The ability unit 502 is a function block that outputs a desired result from the input data, using the neural network that has finished learning through training using deep learning technology. The ability unit 502 can be modeled as a subset of a neural network in which all of the inputs and outputs of each layer of any number and any size are connected. If needed, additional circuits such as a feedback circuit, an arithmetic circuit, a logic circuit, a memory circuit, a synchronous circuit, a delay circuit, and a reset circuit can be added to the model of the ability unit 502. The ability unit 502 includes, for example, the definitions of the AI type, the number of layers, the structure of each layer, an activation function, and a weight filter. When learning is performed, the neural network is subsequently configured with the configuration that is defined by the learning model, and the parameters are optimized. The data output unit 503 is a function block that converts the output from the neural network to information that can be used in the target device 104 or another apparatus, and outputs the information. A specification of the data output from the ability unit 502, and a specification of the data to be ultimately output, which is obtained after the specification of the data output from the ability unit 502 is converted into the data format that the target device 104 requires, and the like are defined in the data output unit 503.

Training Information 304

Figure 5:
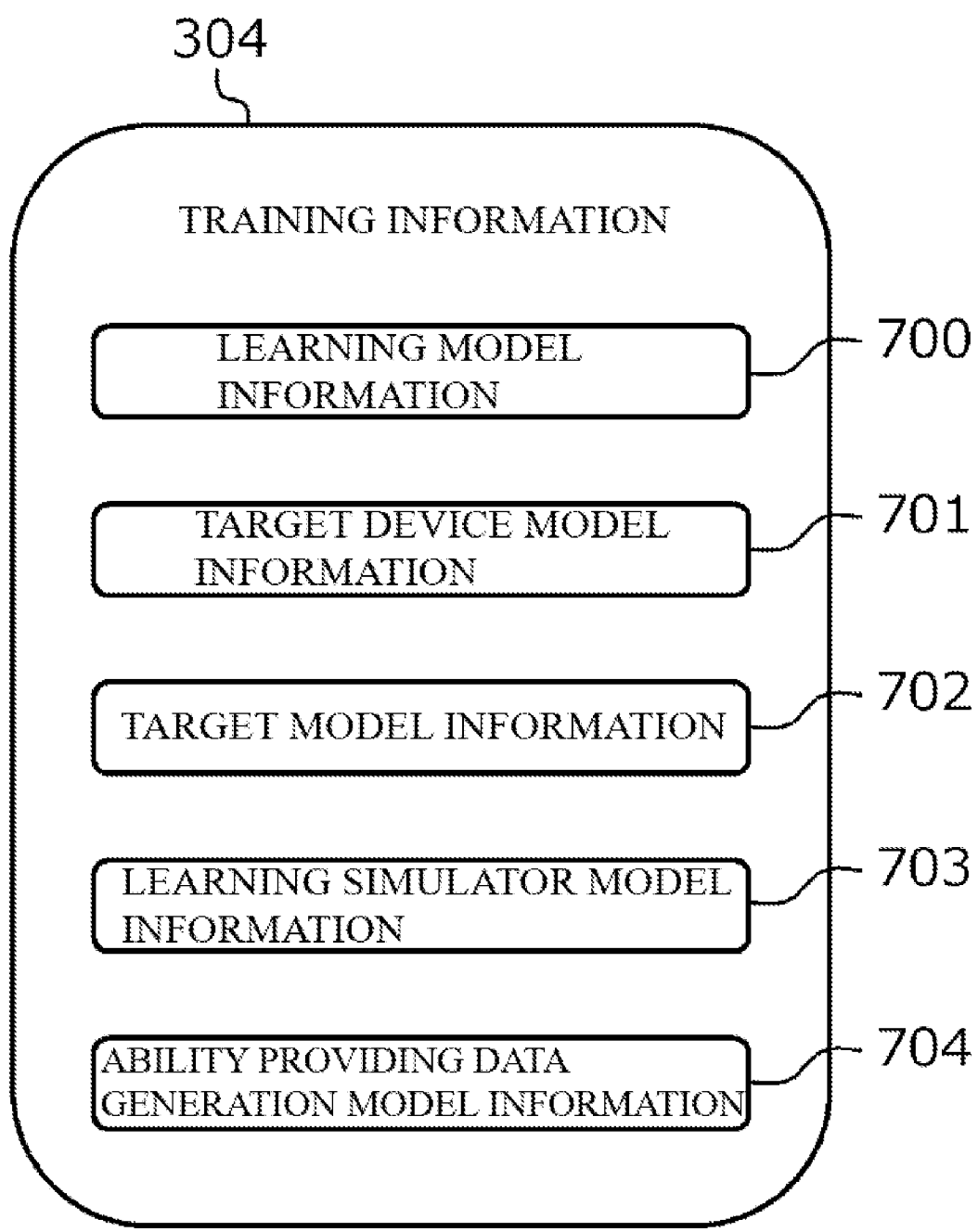
FIG. 5 is a diagram illustrating an example of data structures of training information and training acceptance information.

FIG. 5 is a diagram showing an example of a data structure of training information. The training information 304 defines the necessary information for implementing machine learning, and includes learning model information 700, target device model information 701, target model information 702, learning simulator model information 703, and ability providing data generation model information 704. Hereinafter, each information 700 to 704 is described.

(1) Learning Model Information 700

The learning model information 700 relates to the learning model. The learning model is a model in which a method for acquiring a new ability to be added to the target device 104 through machine learning is formulated. The learning model is generated for each of the handled target devices 104 and the targets 105. Note, that the same learning model can be applied to target devices 104 and targets 105 whose behavior is similar.

The learning model may include the following information.

"Learning goals": Some or all of the items that constitute the goal of the learning are parameterized, and the conditions of the learning goal can be defined as the items that can be designated. As possible learning goals, for example, any goal can be acceptable, such as accuracy or an error of the output result from the ability unit 502, an evaluation result by an evaluation formula, the number of iterative calculations of learning, stability of the output, or the like.

"Definitions relating to input to ability unit": A method of inputting the input data to be received by the ability unit 502 from the target device 104 or another external apparatus is defined. Two kinds of sensor data may be input from the target device 104, for example, and then, if the average of the two types of sensor data is provided to the ability unit 502, the specification of the two types of the sensor data, processing method for acquiring the average data, the specification of the data to be provided to the ability unit, and the like are defined. The handled data may include, for example, images, audio, natural languages, and sensor data, and thus different models are defined for different types and specifications of the data.

"Definitions relating to configuration of ability unit": The inner configuration of the ability unit 502 is defined. If a neural network of deep learning is used, for example, the number of layers, the structure of each layer (a convolution layer, a pooling layer, all connection layers, and nodes), an activation function, a filter, and the like are defined. Multiple configurations (e.g., the range of the number of the layers, the variations of the layer structures, etc.) that can be supported are defined, and the configuration may also be selected within the range of these definitions.

"Definitions relating to output of ability unit": A method of outputting the output data to be output from the ability unit 502 to the target device 104 or the other external apparatus is defined. When the ability unit 502 outputs a prediction probability (actual value), for example, if a binary determination result of whether the probability is larger than a threshold is output to the target device 104, the specification of the prediction probability data, the specification of the determination result data, the specification of the threshold, and the like are defined.

"Method for training ability unit": A method for using the ability unit 502 for machine learning, specifically, a training program for executing machine learning is defined. If an AI engineer prepares the training program, the training can be automatically executed when receiving a request. The training program of deep learning may be created by, for example, designating the configuration of the input and output of the neural network, the configuration of each layer of the neural network, and the data for learning. The training program of deep learning is used for acquiring a new ability, by the data for learning being sequentially input and the parameters of each layer of the neural network being optimized. The training program can also be defined as a model. By parametrizing the selectable items in the training, many variations can be handled with a few models. In one or more embodiments, the aforementioned training program is defined as a model for each learning model presented to the client 101.

The aforementioned learning model can be described using a model coding language. If the learning model is described using a model coding language, the learning model can be automatically converted from the model coding language to a program that can be executed by a simulator. The learning model can be described as a program that can be executed by a simulator without using a model coding language.

Any method that can be stated with a model base (based on a model) can be applied to the learning model. Some programs, for example, for supporting AI technology such as deep learning are available. The learning model can be constructed using these programs. More advanced and faster models can be created. By including information relating to the learning model in the training information, new abilities can be acquired through the learning simulator.

The learning service providing system 100 makes it possible to incorporate the ability that is acquired through learning into the target device 104 using the ability providing data 103, by performing learning simulation with a standardized architecture that is defined by the ability acquisition model 500 for each learning model.

(2) Target Device Model Information 701

The target device model information 701 relates to the model of the target device 104. With the use of the target device model, the system 100 can simulate the operation and the input and output of the target device 104 through a computer simulation, without using the target device 104 (actual device) of the client 101.

The target device model may include the following information.

"Configuration of ability unit (ability recipient unit)": This is information that defines the hardware configuration of the ability recipient unit 904 included in the target device 104. The type of FPGA (Field-Programmable Gate Array) may be designated, for example, or the number of gates may be designated. Alternatively, in the case of software implementation, it is also possible to designate the type of CPU (Central Processing Unit) or GPU (Graphics Processing Unit), and a memory capacity that can be additionally used. When a cloud service is used, it is also possible to designate the cloud type, the CPU classification, the number of CPUs, the clock number, and/or the memory capacity that is used. Not being limited to these examples, the definition of the circuit configuration may be designated with any method.

"Interface specification of ability acquisition model": This defines the connection methods for connection between the data input unit 903, the ability recipient unit 904, and the data output unit 905 that the target device 104 includes. In the case of an FPGA, for example, a definition relating to signals of each input and output terminal is included. In the case of software implementation, a definition of the software interface of the ability recipient unit 904 is included. In the case of using a cloud service, a definition of the communication method for using an ability is included. Any interface that can be defined as a model can be used as the interface of an ability acquisition model.

The data input unit 903, the ability recipient unit 904, and the data output unit 905 of the target device 104 are implemented by hardware or software. The data input unit 903, the ability recipient unit 904, and the data output unit 905 of the target device 104 are respectively configured so as to correspond to the specifications defined by the data input unit 501, the ability unit 502, and the data output unit 503 of the ability acquisition model 500.

In each learning model, the interface specifications need to be matched between the ability acquisition model 901 of the target device 104 and the ability acquisition model 1002 of the learning simulator 203. The interface specifications of the data input unit 501, the ability unit 502, and the data output unit 503 that are defined in the ability acquisition model 500 of the learning model are defined so as to match those of the data input unit 903, the ability recipient unit 904, and the data output unit 905 of the target device 104. By matching the ability acquisition models, an ability acquired with the learning simulator 203 is converted to the ability providing data 103, and can be incorporated to the target device 104.

"Model of basic configuration of device": This is information that defines the basic configuration 902 (components other than the configuration corresponding to the ability acquisition model 500) that the target device 104 originally includes. The configuration 901 corresponding to the ability acquisition model 500 inputs and outputs a signal and data with the basic configuration 902 of the target device 104, and thus the configuration 901 requires the specification of the basic configuration 902 of the target device 104 when performing learning simulation. The model of the basic configuration includes, for example, the definition of the interface between the basic configuration 902 of the target device 104 and any new ability that is realized by the ability acquisition model 901. Specifically, the definitions include the definition of an input signal that is input to the data input unit 903 from the basic configuration 902, the definition of an output signal that is output to the basic configuration of the data output unit 905, and the definition that indicates how each signal is handled in the target device 104.

The target device model may also describe only the interface of the target device 104. The target device model can be generated based on information that was obtained from the client 101 or DB before stating a training.

(3) Target Model Information 702

The target model information 702 relates to a model of the target 105 with which the target device 104 has a relationship. By using a target model, a simulation can be performed in consideration of the target 105 (e.g., another device, environment, or a user that exists outside of the target device 104) that may affect the target device 104.

Hereinafter, examples of the target model information 702 are shown. For a Web service, the target model can be, for example, a model of a browser that supports HTML5. Furthermore, a model that simulates a user may also be added. For a car race game, the rules of the game, the specification and performance of a vehicle and a course specification that are used in the game, and the physical phenomena are modeled. For controlling some device, system, or plant, the target model information 702 is a model of the object to be controlled. Furthermore, if the outer world to which the target device 104 or the device to be controlled reacts is modeled with a physical model or the like, a simulation can be performed including the outer world.

The target model may also describe only the interfaces of the target 105 and the target device 104. The target model can be generated based on the information that was obtained from the client 101 or the DB before starting the training.

(4) Learning Simulator Model Information 703

A learning simulator model defines the configuration of a simulator used for learning in the system 100. In one or more embodiments, a learning simulator is configured by combining a learning model, a target device model, and a target model (details are described later).

(5) Ability Providing Data Generation Model Information 704

The ability providing data generation model defines, for example, a method for generating the "ability providing data" 103 to be incorporated into the circuit of the target device 104 based on the learning result of the system 100. Specifically, it is sufficient that a conversion program for converting the learning result to the ability providing data 103 is prepared as the ability providing data generation model.

In the case of implementation with an FPGA, for example, a neuro circuit, an input interface circuit, and an output interface circuit can be configured. In the case of implementation with software, software that emulates a neuro circuit and a program that sets each parameter obtained as the learning result are prepared. After a circuit for implementing an acquired ability is formed into a component using the ability providing data 103, the component may also be physically inserted into an insertion slot of the target device 104.

The information included in the above-mentioned training information 304 includes constant items whose values have been defined by an AI engineer and parametric items whose values have not been defined. For the parametric items, when a learning request is received, the client 101 needs to input information. For reducing the inputting load on the client 101 and simplifying the learning request, it is preferable that there are as few parametric items as possible. Accordingly, for example, the learning simulator model 703 and the ability providing data generation model 704 may be defined in advance. Also, basic items may be defined for the learning model information 700, the target device model information 701, and the target model information 702, and it is preferable that there are as few items to be input from the client 101 as possible, such as the configuration and the input and output of the ability unit 502 and a learning goal.

Request Acceptance Unit 200

Figure 6:
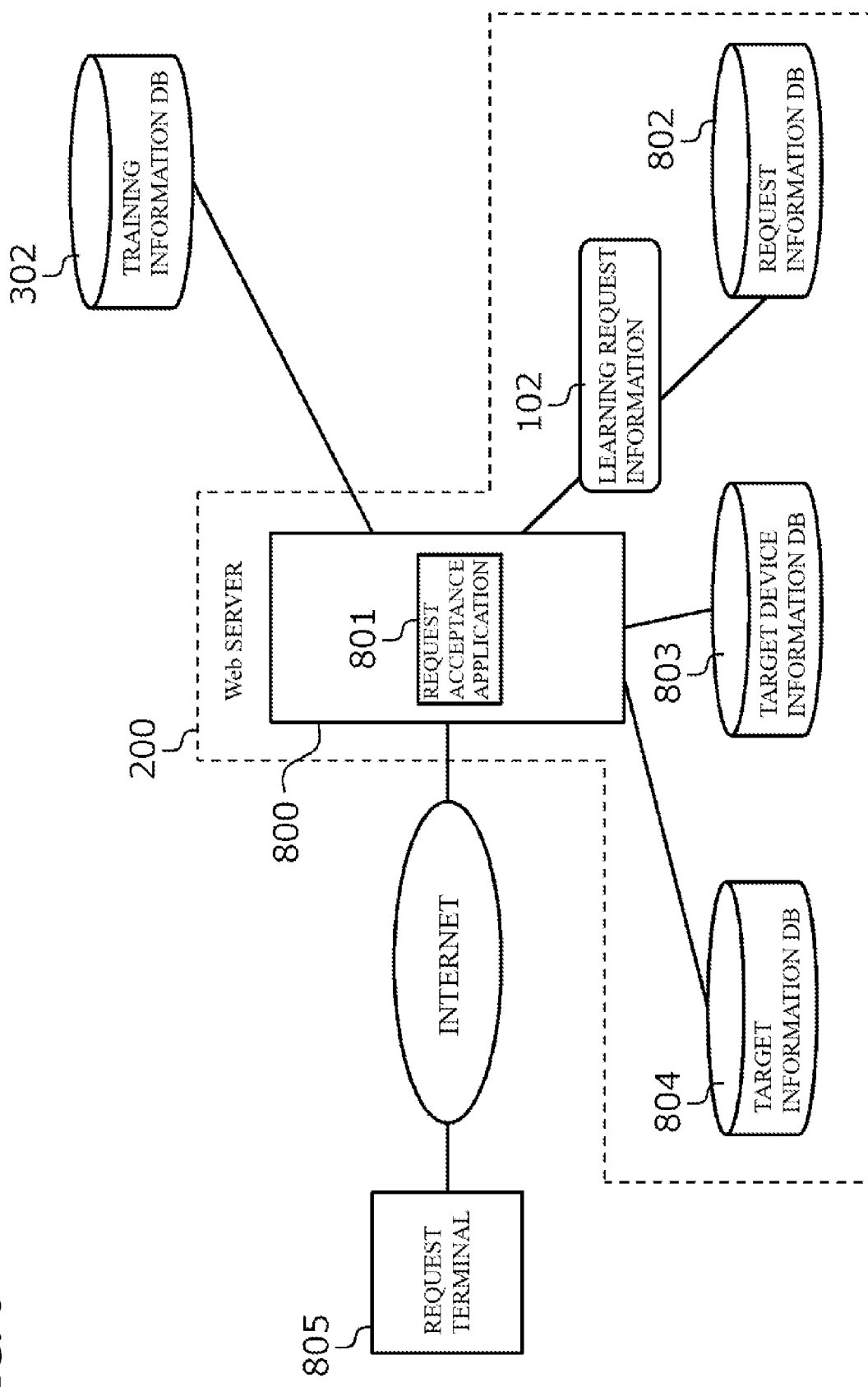
FIG. 6 is a configuration diagram illustrating a request acceptance unit.

The configuration of the request acceptance unit 200 will be described with FIG. 6. The request acceptance unit 200 has a function of accepting (receiving) the learning request information 102 from a request terminal 805 of the client 101 via the Internet. The request acceptance unit 200 is constituted by, for example, a Web server 800 on which a request acceptance application 801 operates, a request information DB 802, a target device information DB 803, and a target information DB 804.

The request acceptance application 801 is a program that provides a function for displaying, in the request terminal 805, an interactive user interface for inputting information necessary for requesting learning and for acquiring the information that is input from the client 101. The request information DB 802 is a database for storing the accepted learning request information 102. The target device information DB 803 is a database for storing information relating to the target device 104 of the client 101, such as the target device model information 701. The target information DB 804 is a database for storing information relating to the target 105, such as the target model information 702.

The request acceptance unit 200 presents, to the client 101, a learning menu for selecting a desired learning model from multiple learning models registered in the training information DB 302. If the desired learning model is designated by the client 101, the request acceptance unit 200 accepts necessary information for implementing machine learning and generates the learning request information 102, by using the training information 304 corresponding to the designated learning model (type of machine learning). Necessary input items include, for example, the type and specification of input data, a learning goal, the type and specification of output data, information for specifying a target device or a target device model, and information for specifying a target or a target model.

The request acceptance unit 200 registers the learning request information 102 with the request information DB 802. The learning request information 102 includes, for example, information for specifying the training information 304 corresponding to the selected learning model and information that is input from the client 101 (e.g., values of the parametric items). The request acceptance unit 200 notifies the learning instruction unit 202 that the registration of the learning request information 102 is complete.

Note, that the request acceptance unit 200 can also accept a request file in which information necessary for learning is given in a system coding language or the like from the request terminal 805. If there is no learning model that the client 101 desires in the learning menu, for example, the client 101 can create a request file in which a desired learning content is stated and requests the learning. If the learning request with the request file is accepted, an AI engineer creates a new learning model based on the request file, and adds the learning model to the learning menu.

Target Device 104

The client 101 designates the target device 104 to be provided with an ability, and requests learning. Any device can be the target device 104, if a new ability that is in accordance with the ability acquisition model 500 can be added to the device. Image classification devices that classify still images, monitoring devices that monitor with sensor data, prediction systems that predict motion of a target using moving images, Web server systems, autonomous driving devices can be given as examples.

The configuration of the target device is schematically shown in FIG. 7. The target device 104 mainly includes an ability setting unit 900, a configuration 901 conforming to the ability acquisition model 500, and a basic configuration 902 that is originally included in the target device 104. The configuration 901 conforming to the ability acquisition model 500 is constituted by a data input unit 903, an ability recipient unit 904, and a data output unit 905. If the target device 104 has a component that operates with sequence control (in the following, referred to as "sequence control unit"), the sequence control unit is included in the basic configuration 902. The ability setting unit 900 has a function of setting the configuration 901 conforming to the ability acquisition model 500 such that the ability recipient unit 904 can exhibit a new ability, by using the ability providing data 103 that is provided from the system 100.

The configuration 901 conforming to the ability acquisition model 500 is constituted by hardware whose functionality can be changed. The configuration 901 may also have, for example, a configuration that rewrites a program of a rewritable electronic circuit (an FPGA, etc.) after the target device 104 has been assembled. Also, the configuration 901 may also have a configuration that changes a program executed by a processor such as a CPU or a GPU, or changes parameters that are used in the program. For a program that emulates a neural network, for example, functions of the neural network can be changed by changing the parameters. Alternatively, the configuration 901 may also have a configuration whose functionality can be changed by replacing a part of the parts or the connected device.

Figure 8:
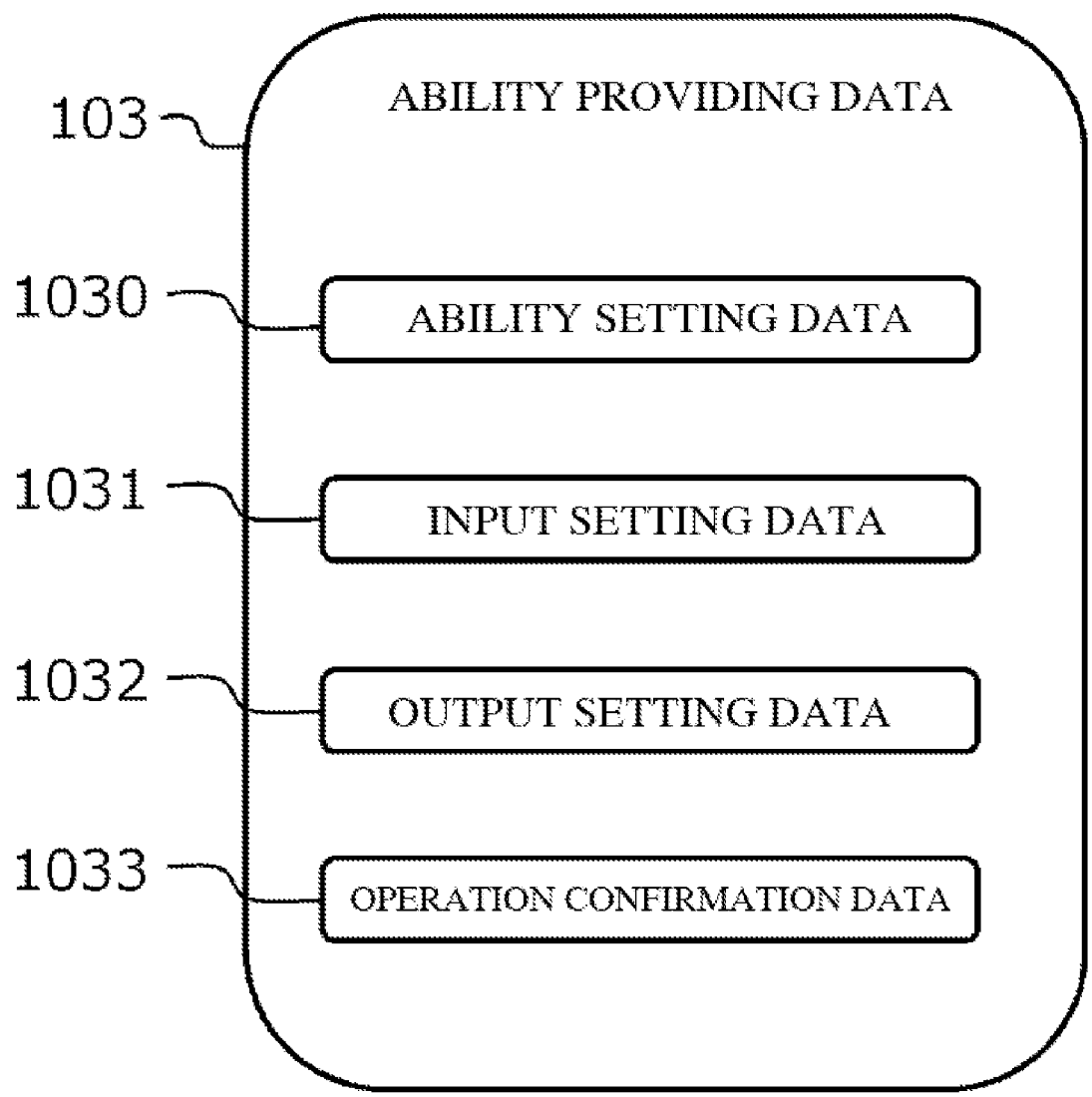
FIG. 8 is a diagram illustrating an example of a data structure of ability providing data.

As shown in FIG. 8, the ability providing data 103 has, for example, a data structure including ability setting data 1030, input setting data 1031, and output setting data 1032. The ability setting data 1030 is data for setting, in the ability recipient unit 904, a function for implementing a new ability that is acquired through learning (e.g., a classification ability of images by a neural network). The input setting data 1031 is data for setting, in the data input unit 903, a function relating to the interface of the data input to the ability recipient unit 904. Functions relating to the interface of the data input include, for example, a function of importing necessary data from the basic configuration 902 of the target device 104 to the data input unit 903, a function of importing the necessary data from a device other than the target device 104 (e.g., a sensor) to the data input unit 903, a function of performing the necessary processing (e.g., equalization, integration, sampling, noise reduction, feature quantity extraction, binarization, color conversion, and resolution conversion) to the imported data, and a function of converting the processed data to the data format conforming to the ability recipient unit 904. The settings of at least one of these functions may be provided as the input setting data 1031. Also, the output setting data 1032 is data for setting, in the data output unit 905, a function relating to the interface for the data output from the ability recipient unit 904. Functions relating to the interface for the data output include, for example, a function of performing the necessary processing (e.g., equalization, integration, sampling, noise reduction, feature quantity extraction, binarization, color conversion, and resolution conversion) to the data that is output from the ability recipient unit 904, and a function of converting the processed data to the data format conforming to the basic configuration 902 of the target device 104. The settings of at least one of these functions may be provided as the output setting data 1032. The ability setting data 1030, the input setting data 1031, and the output setting data 1032 may also be a program as such, parameters that are used in a program, or both of a program and parameters. The data input unit 903, the ability recipient unit 904, and the data output unit 905 can execute information processing that corresponds to a new ability, by the ability setting unit 900 setting the configuration 901 that corresponds to the ability acquisition model 500 with the setting data that is provided from the ability providing data 103.

If needed, the ability providing data 103 can include operation confirmation data 1033. The operation confirmation data 1033 is data used for confirming whether a new ability set in the data input unit 903, the ability recipient unit 904, and the data output unit 905 correctly operates. By providing the data 1030 to 1032 used for setting the new ability and the operation confirmation data 1033 as a set, the client or the target device 104 can easily confirm whether the new ability has been successfully incorporated, which increases user-friendliness.

The operation confirmation data 1033 includes one or more pieces of data, and a determination information for determining whether output data is data to be output from the data output unit 905 (correct output data), which was processed in the ability recipient unit 904 when that input data was input to the data input unit 903. If a new function to be added to the ability recipient unit 904 is the ability to classify still images, for example, the operation confirmation data 1033 may include one or more pieces of data as the input data, and may include a correct classification of each still image as the determination information. Also, if a function to be added to the ability recipient unit 904 is the ability to perform image inspection on products, the operation confirmation data 1033 may include image data of good products and defective products as the input data, and may include a correct inspection result (whether a product is a good product or a defective product) of each image data as the determination information. Also, if a function to be added to the ability recipient unit 904 is the ability to identify a speaker's voice, the operation confirmation data 1033 may include one or more pieces of voice data, and may include information on each speaker of the voice data as the determination information.

If the ability providing data 103 includes the operation confirmation data 1033, the ability setting unit 900 inputs the input data in the operation confirmation data 1033 to the data input unit 903 after setting the setting data 1030 to 1032 into the configuration 901 of the target device 104. Then, the ability setting unit 900 determines the data that is output from the data output unit 905 by using the determination information in the operation confirmation data 1033, and confirms whether a correct output is obtained. In this manner, the series of operations by the data input unit, the ability unit, and the data output unit can be confirmed. If the correct output is obtained, the new ability can be successfully added to the target device 104. On the other hand, if the data that is output from the data output unit 905 differs from the correct output, it is conceivable that either the ability providing data 103 was defective, or the settings in the configuration 901 of the target device 104 were defective. In this case, the ability setting unit 900 may reset the settings by using the ability providing data 103, or may notify the learning service providing system 100 of the defect. In this manner, operation confirmation and troubleshooting can be automatically performed, which increases user-friendliness.

The data input unit 903 that has been set acquires data from the basic configuration 902 of the target device 104, performs necessary processing on the data, converts its data format so as to make it compatible with the ability recipient unit 904, and inputs the converted data. As the input data, for example, camera data, sensor data, or event data is input. In natural language processing, many text files are input as the input data.

The data output unit 905 that has been set performs necessary processing on the data that is output from the ability recipient unit 904, converts its data format so as to make it compatible with the basic configuration 902 of the target device 104, and outputs the converted data. The output from the neural network incorporated in the ability recipient unit 904 is input to the data output unit 905, for example, and the data is output from the data output unit 905 to the basic configuration 902.

The details of the ability recipient unit 904 will be described with specific examples. The ability recipient unit 904 accepts, for example, a new ability by configuring a neural network based on the ability providing data 103 that is input from the outside. The ability recipient unit 904 and the ability providing data 103 may be realized as follows, for example.

As a rewritable electronic circuit (e.g., an FPGA): In this case, for example, the circuit and the parameter data of the neural network that are written in the rewritable electronic circuit serve as the ability providing data.

An ability is implemented as a program for a CPU: In this case, for example, an executable CPU program that calculates the operations of the neural network circuit serves as the ability providing data.

An ability is implemented as a program in a GPU: In this case, for example, an executable GPU program that calculates the operations of the neural network circuit is to be ability providing data.

A case that an ability is added as a part. In this case, for example, a rewritable FPGA into which the neural network is written serves as the component including the ability providing data.

An ability is used as a cloud service: In this case, for example, an application program of a network service in which any of above cases is incorporated is the ability providing data.

An ability is used that is provided outside by a device other than the target device: In this case, a program for using a device in which any of the above cases is incorporated serves as the ability providing data.

An ability is added as a device: In this case, for example, a program that uses a device in which any of the above cases are incorporated serves as the ability providing data.

Target Device Model

Regardless what kind of device the target device 104 is, as shown in FIG. 7, the target device 104 can be modeled with a combination of the configuration 901 corresponding to the ability acquisition model 500 and the basic configuration 902 that is originally included in the target device 104. The combination of a basic configuration model that corresponds to the basic configuration 902 and the ability acquisition model 500 becomes a model of the target device 104 after acquiring the new ability. The operations of the target device 104 can be simulated on a computer, by using this target device model and a target model in which the target (object) 105 outside of the target device 104 is modeled. For the basic configuration model, not all configurations included in the target device 104 are necessarily modeled. It is sufficient that at least the configuration of those parts that mutually affect the ability acquisition model 500 are defined by the basic configuration model.

Embodiment 1 of Target Device

FIG. 9 shows a block diagram of an image inspection device that inspects an object to be inspected using images, as one or more embodiments of the target device 104. The basic configuration 902 of the target device 104 includes an image input unit 910, a sequence control unit 911, and an inspection result output unit 912. Also, as external devices, a camera 913 that takes a picture of the object to be inspected and a sensor 914 that detects the object to be inspected are connected to the target device 104. Image data that is imported from the camera 913 is input to the image input unit 910, and a detection signal from the sensor 914 is input to the sequence control unit 911.

First, operations before a new ability is added (operations performed only by the basic configuration 902) will be described. It is assumed that an object to be inspected reaches a position where the camera 913 can take a picture, 10 msec after the sensor 914 detected the object to be inspected flowing on a conveyor. When it receives a detection signal from the sensor 914, the sequence control unit 911 outputs a control signal to the image input unit 910 such that the image input unit 910 holds the image data that is obtained 10 msec after the inspection device was detected by the sensor 914. Next, the sequence control unit 911 imports the image data that is latched in the image input unit 910, and inspects the object to be inspected by using that image data. In the case of an appearance inspection of a surface mounting substrate, for example, inspection items include the presence or absence of components, solder joint quality, and the like. The sequence control unit 911 sends the inspection result to the inspection result output unit 912, and the inspection result output unit 912 outputs the inspection result to external devices (e.g., a display, a production management system, production devices provided upstream or downstream, and a portable device of a manager).

Next, operations after a new ability is added will be described. In one or more embodiments, it is assumed that the configuration 901 corresponding to the ability acquisition model is constituted by an FPGA, and inspection processing relating to an inspection item that is different from the basic configuration 902 is added as a new ability. When it receives a detection signal from the sensor 914, the sequence control unit 911 outputs a control signal to the image input unit 910 such that the image input unit 910 holds the image data that is obtained 10 msec after the inspection device was detected by the sensor 914. Next, the sequence control unit 911 imports the image data that is latched in the image input unit 910, and inspects the object to be inspected using that image data. On the other hand, the sequence control unit 911 outputs, to the data input unit 903, a control signal such that the image data that is latched in the image input unit 910 is imported also to the configuration 901. The data input unit 903 performs necessary preprocessing and data conversion to the imported data, and inputs that data to the ability recipient unit 904. The ability recipient unit 904 performs inspection using that data, and outputs a result. The data output unit 905 performs the necessary postprocessing and data conversion on the output from the ability recipient unit 904, and outputs the converted data to the sequence control unit 911. If it takes 1 msec from when the data is imported in the data input unit 903 until the result is output, the sequence control unit 911 receives the data, as the inspection result, that is output from the data output unit 905, 11 msec after the sequence control unit 911 received the inspection signal from the sensor 914. The sequence control unit 911 sends, to the inspection result output unit 912, the inspection result of the basic configuration 902 and the inspection result of the ability recipient unit 904, and the inspection result output unit 912 outputs the inspection result to the external devices. In the above-mentioned manner, the data and the processing result can be delivered between the basic configuration 902 and the configuration 901 in which the new ability is implemented, and cooperation (coordination) of the sequence control and the new ability that is acquired through machine learning can be realized.

Note, that the learning of the new inspection processing can be, for example, requested as follows. A client prepares image samples of good products and defective products (data with a teacher). Then, the client requests the learning service providing system 100 to learn the classification of images with the images. The learning service providing system 100 performs learning through deep learning using the image samples provided from the client. In this manner, a neural network capable of distinguishing between good and defective products can be acquired. The learning service providing system 100 generates ability providing data 103 for implementing this neural network to the FPGA of the target device 104, and provides the ability providing data 103 to the client. The configuration 901 for performing the new inspection processing can be added to the target device 104, by the ability setting unit 900 rewriting the program of the FPGA using the ability providing data 103.

Embodiment 2 of Target Device

Figure 10:
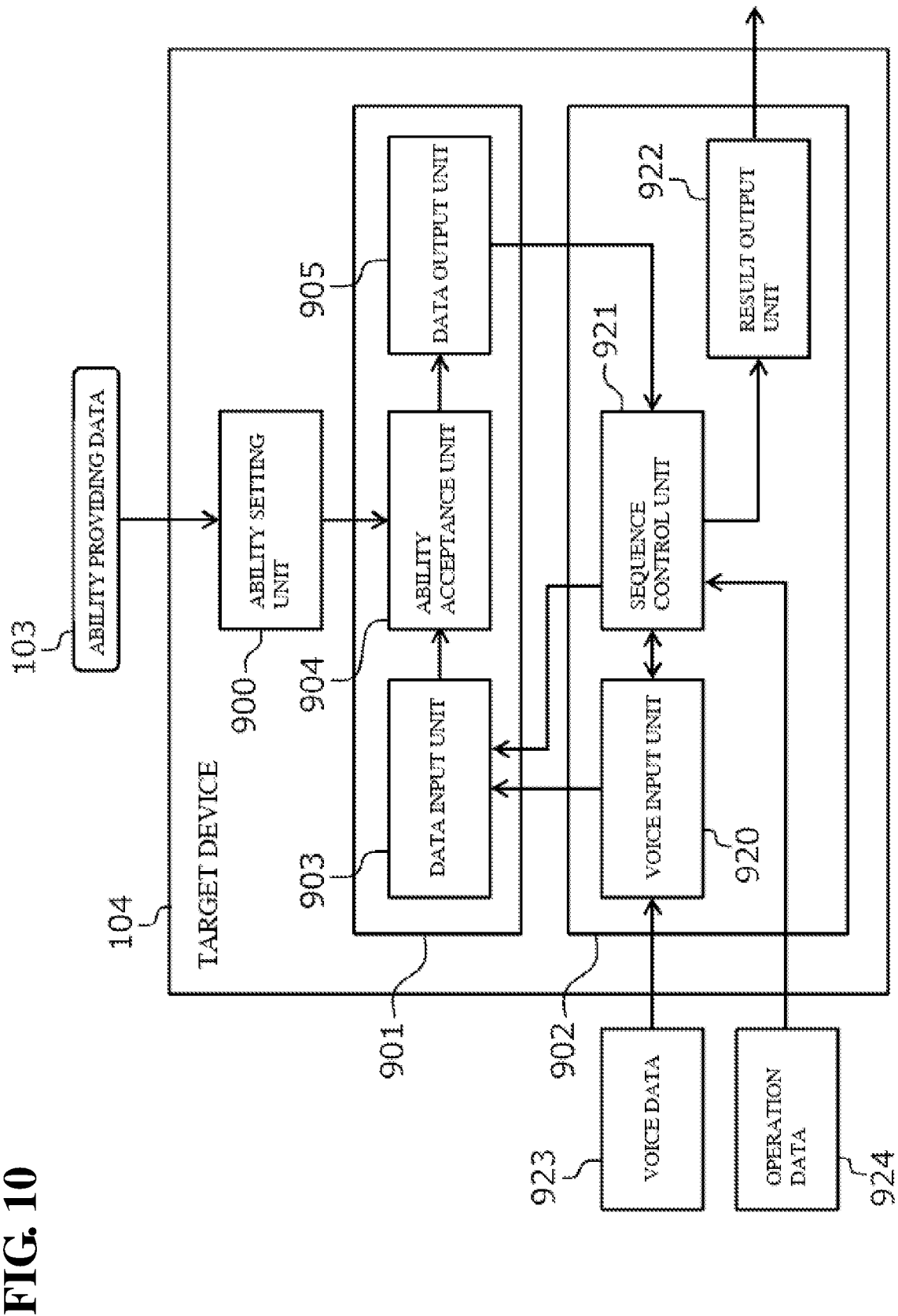
FIG. 10 is a configuration diagram illustrating a target device for processing voice.

FIG. 10 shows a block diagram of a speaker identification device that identifies a speaker by his or her voice, as one or more embodiments of the target device 104. This target device 104 is constituted by a cloud server, and is a system for providing a speaker identifying service to a user via the Internet. The user can use the speaker identifying service that is provided from the target device 104, by installing a front end application of the speaker identifying service on a user terminal such as a smartphone or a tablet PC.

The basic configuration 902 of the target device 104 has a voice input unit 920, a sequence control unit 921, and a result output unit 922. Voice data 923 that is received from the application of the user is input to the voice input unit 920, and operation data 924 (menu selection and button pressing, etc.) that is input through the application of the user terminal is input to the sequence control unit 921. It is assumed that a speaker identification algorithm is added to the ability recipient unit 904 as a new ability. Note, that the configurations 901 and 902 of one or more embodiments are functions that are implemented by a program that is executed by a CPU.

If the user designates voice data on the application of the user terminal and presses an identification button, the voice data 923 of that voice and the operation data 924 including an identification request is transmitted to the target device 104. When it receives the identification request, the sequence control unit 921 outputs a control signal to the data input unit 903 such that the data input unit imports the voice data 923 that was imported by the voice input unit 920. The data input unit 903 performs the necessary preprocessing and data conversion on the imported voice data, and inputs that data to the ability recipient unit 904. The ability recipient unit 904 identifies a speaker using that data, and outputs a result. The data output unit 905 performs the necessary postprocessing and data conversion on the output from the ability recipient unit 904, and outputs the converted data to the sequence control unit 921. The sequence control unit 921 sends the identification result to the result output unit 922, and the result output unit 922 outputs the identification result to the user terminal. In the above-mentioned manner, the data and the processing result can be delivered with both the function that is provided by the basic configuration 902 and the added new function, and cooperation (coordination) of the sequence control and the new ability that is acquired through machine learning can be realized.

Note, that learning of the speaker identification algorithm can be, for example, requested as follows. A client prepares voice samples of persons to be identified (data with a teacher). Then, the client requests the learning service providing system 100 to learn the identification of speakers with the voice samples. The learning service providing system 100 performs learning through deep learning using the voice samples provided from the client. In this manner, a neural network capable of identifying speakers can be acquired. The learning service providing system 100 generates ability providing data 103 for executing this neural network with the CPU of the target device 104, and provides the ability providing data 103 to the client. The configuration 901 having a speaker identifying ability, which is a new ability, can be added to the target device 104, by the ability setting unit 900 installing the program and data provided through the ability providing data 103.

Although a configuration in which the target device 104 includes only one ability acquisition model is shown in FIGS. 9 and 10, the configuration may also include multiple ability acquisition models. Including multiple ability acquisition models makes it possible to acquire multiple abilities. Although an example in which the target device 104 and the learning service providing system 100 are implemented as different devices in the above-mentioned embodiments, the target device 104 may also include some or all of the learning service providing system 100. In this configuration, the target device 104 becomes a product having a self-learning ability. A humanoid robot having a learning ability according to one aspect can, for example, learn by receiving a learning request from a person, and can provide ability providing data to another robot, which has the same configuration as that robot.

The service of the system 100 can deal with any type of target devices 104, if a target device model and a target model are provided. Note, that these models can be created and provided by the client 101 or another person other than the client 101. A vendor who provides components and products to the client 101 may also provide the models to the client 101, for example, or a service provider of the system 100 may also provide the models. Also, when a target device model and a target model have already been designated in the target device information DB 803 and the target information DB 804 of the system 100, the client 101 can also use the models designated in these DBs. In this case, when a learning request is accepted, the client 101 may be requested to input information for specifying the target device 104 (model of the device, etc.) or information for specifying the target device model (model ID, etc.). This similarly applies to the target model.

Learning Simulator 203

Figure 11:
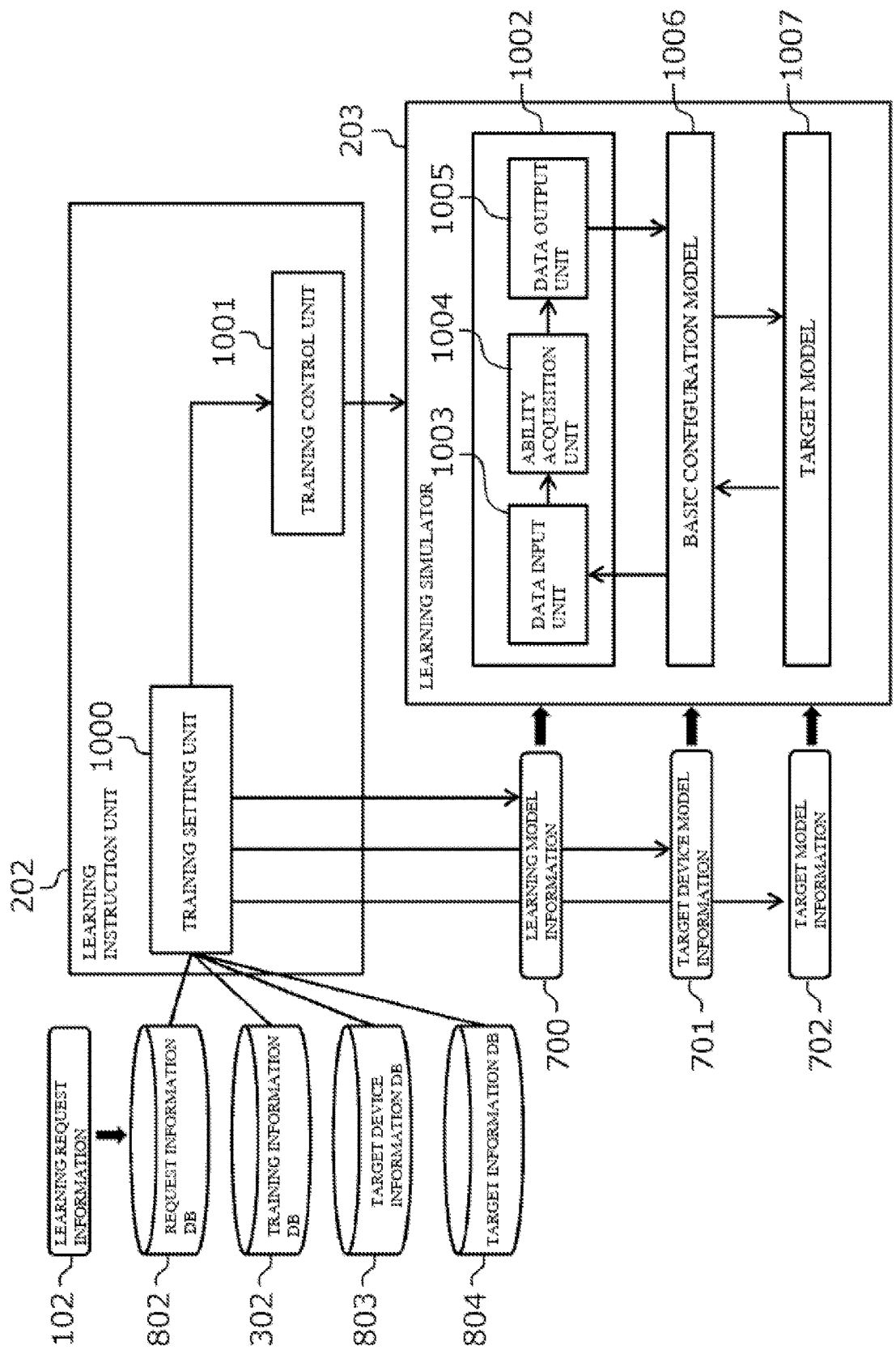
FIG. 11 is a detailed configuration diagram illustrating a learning instruction unit and a learning simulator.

FIG. 11 shows a detailed configuration of the learning instruction unit 202 and the learning simulator 203.

The learning simulator 203 performs machine learning of a new ability that is added to the target device 104 while simulating the operations of the target device 104, by using a basic configuration model 1006 of the target device 104, an ability acquisition model 1002, and a target model 1007. The ability acquisition model 1002 includes a data input unit 1003, an ability unit (ability acquisition unit) 1004, and a data output unit 1005.

The ability acquisition unit 1004 simulates a portion that executes the ability that is incorporated in the target device 104 of the client 101. The circuit configuration of the ability acquisition unit 1004 can be suitably changed when learning is performed. The ability acquisition unit 1004 can be realized by, for example, a neural network of deep learning. The number of layers of the neural network and the configuration of each layer are set based on the learning model information 700.

The data input unit 1003 simulates the operation that it receives data from the outside of the ability acquisition model 1002, performs the necessary processing on the data, and then inputs the processed data to the ability acquisition unit 1004. The data input unit 1003 can receive data not only from the basic configuration 902 of the target device 104, but also from the outside of the target device 104. As a mode of receiving data from the outside of the target device 104, for example, a mode of acquiring sensor data from a sensor connected to the target device 104, a mode of acquiring data from a database, a mode of receiving a data stream through a network or the like can be envisaged.

The data output unit 1005 simulates the operation that it receives data from the ability acquisition unit 1004, performs the necessary processing on the data, and then outputs the processed data to the outside of the ability acquisition model 1002. The data output unit 1005 converts, for example, the output from the neural network of the ability acquisition unit 1004 into the data format that is required by the basic configuration 902 of the target device 104 or a device external to the target device 104.

The basic configuration model 1006 simulates the operations of the basic configuration 902 of the target device 104. If the ability acquisition unit 1004 mutually affects the basic configuration 902 of the target device 104, the data input unit 1003 acquires the necessary data from the basic configuration model 1006, and the data output unit 1005 gives the output of the ability acquisition unit 1004 to the basic configuration model 1006.

The target model 1007 simulates the target 105 external to the target device 104. The target model 1007 simulates, for example, another device to which the target device 104 is connected, a surrounding environment of the target device 104 (including physical phenomena), an implement that the target device handles, an object that the target device 104 produces and processes, an operator who operates the target device 104, and the like.

The learning simulator 203 may also be constituted by, for example, a cloud server group installed on the Internet, or by a private server group existing on a local area network. For speeding up the simulation processing, a dedicated system such as an incorporated simulator may also be used. A configuration is possible in which a part of software processing is replaced with hardware. For each learning model, it is possible to select the most suitable configuration as a device for performing a simulation, such as a request with a large data amount, a configuration with a large number of layers, a configuration requiring real time learning, and the like.

The simulation can be sped up, for example, by using a method using distributed processing executed by many CPUs, a method using a high-speed arithmetic device called GPU, or the like. Also, by configuring a neuro circuit with an FPGA or the like, a parallel operation is performed, and thus the simulation can be performed at high speed. Such speeding up methods can be included in the learning simulator model.

The simulator can be connected to the actual device (the target device 104 of the client 101). The target device 104 of the client 101 may also be, for example, connected to the simulator (a computer that executes the simulation). Alternatively, it is possible to execute the simulation with a circuit (a CPU, a GPU, an FPGA, or the like) of the target device 104 of the client 101. Applying IOT technology makes it possible to deal with real time big data. By using this technology, it is possible to send various kinds of data relating to the target device 104 of the client 101 to the simulator in real time via the Internet, and to perform a simulation using that data. Alternatively, the simulator may also include a function corresponding to a model of the target device 104.

A device that provides a service is used as the simulator. In the case of a Web service with natural language processing, for example, both of the Web service and a learning service can be performed using a server resource on a cloud.

Learning Instruction Unit 202

The learning instruction unit 202 is a processing unit for setting and controlling a training, and includes a training setting unit 1000 and a training control unit 1001 as shown in FIG. 11. The training setting unit 1000 makes settings necessary for a training with the learning simulator 203, based on the learning request information 102 that is accepted from the client 101 and the corresponding training information 304. The training control unit 1001 performs a training by controlling the learning simulator 203, and develops an ability to be added to the target device 104 (generates an ability through learning).

Specifically, the training setting unit 1000 sets a learning goal, the specifications or processing contents of input and output data of the data input unit 1003 and the data output unit 1005, the inner configuration of the ability acquisition unit 1004, a training program and the like, based on the learning model information 700. Also, the training setting unit 1000 sets, for example, an input and output between the basic configuration model 1006 of the target device 104 and the ability acquisition model 1002, based on the target device model information 701. Furthermore, the training setting unit 1000 sets the target model 1007 based on the target model information 702.

Ability Providing Data Generation Unit 204

The ability providing data generation unit 204 converts a learning result of the learning simulator 203 (an ability acquired through a training) into data (the ability providing data 103) to be incorporated into the ability recipient unit 904 of the target device 104. A conversion program for generating the ability providing data 103 from the learning result has been provided from the ability providing data generation model information 704. With this conversion program, the ability providing data 103 (e.g., a program and parameters used in the program) is generated, which corresponds to the hardware configuration that the target device 104 includes (e.g., a circuit configuration such as an FPGA, a CPU, or a GPU). As mentioned above, it is sufficient that the ability providing data 103 includes ability setting data, input setting data, and output setting data.

Service Providing Unit 205

The service providing unit 205 provides, to the client 101, the ability providing data 103 that is generated by the ability providing data generation unit 204. The providing method may be any method. The service providing unit 205 may also transmit the ability providing data 103 to the client 101, by using an electronic means (e.g., an electronic mail, an FTP, or download from a file server). Also, the service providing unit 205 may store the ability providing data 103 in a storage medium such as a DVD-ROM, and the storage medium may be sent to the client 101. In addition, the service providing unit 205 may also directly transmit the ability providing data 103 to the target device 104 of the client 101 via a network. The ability providing data 103 may also be provided as a program that the target device 104 can execute, or as a program executed on a cloud or a service that is provided from the cloud. Also, the ability providing data 103 may be provided in the mode of an IoT service in which multiple devices are combined. In addition, the ability providing data 103 may also be incorporated in a semiconductor part, or mounted on a component that can be incorporated in the target device 104. Alternatively, service staff may visit the client 101 and may mount the ability providing data 103 on the target device 104. Also, after the target device 104 is received from the client 101 and the ability providing data 103 is incorporated, the target device 104 may also be returned.

Operation of System

Figure 12:
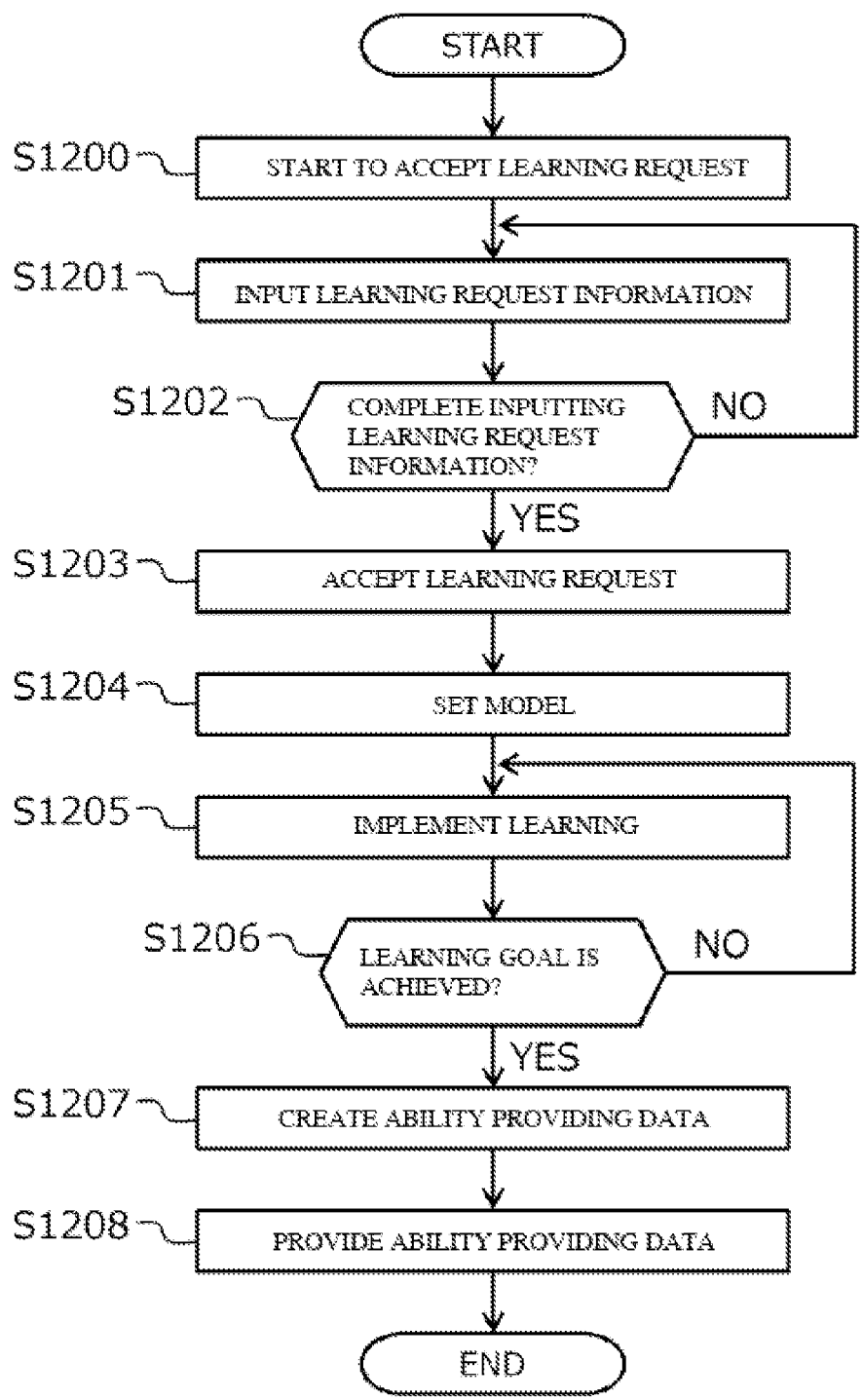
FIG. 12 is a processing flow illustrating a learning service providing system.

FIG. 12 shows a processing from when a learning request is accepted in the learning service providing system 100 until ability providing data is provided.

When the client 101 accesses the system 100 via the Internet and requests a new learning, the request acceptance unit 200 starts to accept the learning request (step S1200). The request acceptance unit 200 displays a request input screen in the request terminal 805 of the client 101, and causes the client 101 to input a desired learning model and information necessary for the learning (step S1201). If the input of the learning request information is complete (YES in step S1202), the request acceptance unit 200 resisters the learning request information 102 in the request information DB 802, and notifies the learning instruction unit 202 that a new learning request is accepted (step S1203).

Figure 13:
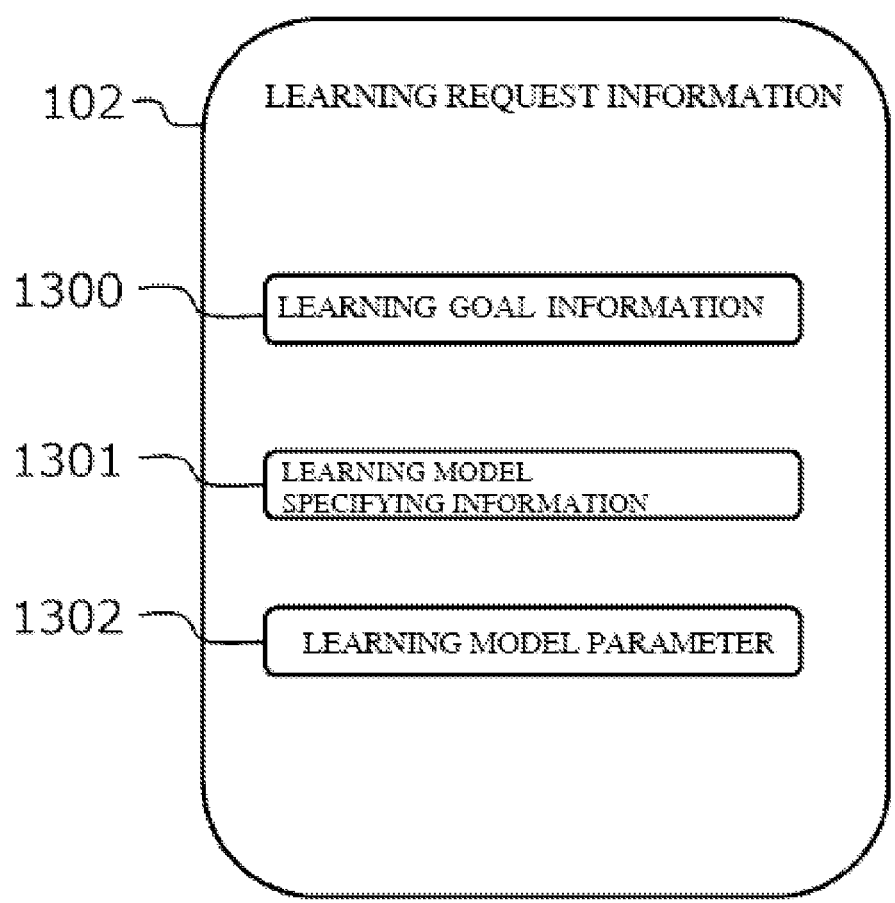
FIG. 13 is a diagram illustrating an example of a data structure of learning request information.

FIG. 13 shows an example of the data structure of the learning request information 102. The learning request information 102 includes learning goal information 1300, learning model identifying information 1301, and a learning model parameter 1302. The learning goal information 1300 include information relating to the learning goal that is designated by the client 101. The learning model identifying information 1301 includes information for specifying the training information 304 corresponding to the learning model that is designated by the client 101 (e.g., an ID of the training information 304 in the training information DB302). The learning model parameter 1302 includes information that is input from the client 101 about each parametric item of the learning model.

Next, the learning instruction unit 202 sets, for example, a learning model, a target device model, and a target model to the learning simulator 203 in accordance with the learning request information 102 (step S1204), controls the learning simulator 203, and performs a training (step S1205). If the case of a neural network such as deep learning, for example, an output is evaluated while stepwisely changing parameters for each of multiple layers, and the parameters are optimized such that the conformity with the learning goal is increased. If the conformity for the learning goal satisfies preset completion conditions (YES in step S1206), the learning instruction unit 202 ends the training.

Next, the ability providing data generation unit 204 generates the ability providing data 103, based on a learning result of the learning simulator 203 (an ability that is acquired through the training) (step S1207). Finally, the service providing unit 205 provides the ability providing data 103 to the client 101 (step S1208).

Advantages of this System

The client 101 has the following advantages. First, because the client 101 does not need to perform machine learning if using this system 100, the efficiency of development work for adding a new ability to the target device 104 can be improved. Also, because the client 101 only needs to provide the information necessary for machine learning, even a person who has no knowledge of or system for machine learning can easily use the system 100. In addition, a learning result is provided with the ability providing data 103 (data for adding a new ability to the target device 104), and thus the client 101 can easily add new abilities that are acquired through machine learning to the target device 104 of the client 101.

On the other hand, a service provider has the following advantages. Because the information necessary for machine learning is provided from the client 101, it is guaranteed that the machine learning is implemented as requested. Also, processing such as the acceptance of requests from the client 101, the implementation of machine learning and the like can be automated and made as efficient as possible. Furthermore, because a learning result is converted to the ability providing data 103 and provided to the client 101, providing of the learning result and implementing in the target device 104 can also be automated and made as efficient as possible.

In addition, by performing a simulation using a target device model and a target model in the process of machine learning, machine learning can be performed in consideration of the behaviors and the influence of the target device 104 and the target 105, even if there is no actual target device 104. If no actual target device 104 is needed, machine learning can extremely easily be performed on behalf of the client. Especially, it is not realistic to use an actual device for machine learning in the case of large scale devices or in-service devices such as production equipment. This learning service can be used for such cases, and has excellent flexibility and convenience of application.

In addition, a new ability can be easily added to the target device 104, by providing an architecture that is modeled as the ability acquisition model 500, and the ability setting unit 900 that sets a functionality based on the ability providing data 103. In this manner, it is possible to provide the target device 104 with excellent extensibility having a mechanism for easily adding a new ability provided from the outside. In addition, it becomes easy to outsource the development of new abilities, which can improve the efficiency of development work.

The configuration of the abovementioned embodiments merely shows a specific example of the present invention, and is not intended to limit the scope of the present invention. The present invention can take various specific configurations, without departing from the technical concept of the invention. The system configuration, the data structure, the user interface, the parameters and the like shown in the above embodiments are examples, these can be suitably changed according to a type of machine learning, a learning goal, an ability to be acquired, the configuration of a target device or the like. Also, in the above embodiments, an example is shown, in which a new ability to be added to the target device 104 is acquired through machine learning, but the acquisition method of a new ability is not limited to machine learning. The ability may also be, for example, an ability that is acquired through a three-dimensional structure simulation using a finite element method, a flow simulation, an optimization problem, or the like, or may also be an ability that is developed by a person.

Supplementary Remark 1

A device with extensibility including:
at least one memory, and at least one hardware processor connected to the memory,
wherein the hardware processor constitutes an architecture that is modeled as an ability acquisition model including an ability unit configured to perform an ability, a data input unit that is an interface for an input of the ability unit, and a data output unit that is an interface for an output from the ability unit, as an architecture for additionally incorporating a new ability to a basic configuration of the device, and
the hardware processor adds the new ability to the device by setting a function to each of the ability unit, the data input unit, and the data output unit, based on ability providing data including ability setting data, input setting data, and output setting data.

The invention claimed is:

1. A device with extensibility, comprising a processor configured to perform operations comprising:
operation according to a basic configuration of the device;
operation according to an architecture incorporating a new ability to the basic configuration of the device, the architecture incorporating the new ability being modeled according to an ability acquisition model comprising:
an ability unit configured to implement the new ability;
a data input unit comprising an interface for an input to the ability unit; and
a data output unit comprising an interface for an output from the ability unit; and
operation as an ability setting unit configured to add the new ability to the device by setting a functionality of each of the ability unit, the data input unit, and the data output unit, based on ability providing data comprising ability setting data, input setting data, and output setting data.

2. The device with extensibility according to claim 1, wherein the processor is configured such that operation according to the basic configuration comprises operation as a sequence control unit configured to operate with sequence control.

3. The device with extensibility according to claim 2, wherein the processor is configured such that:
operation as the data input unit comprises operation to import data from the basic configuration based on a control signal from the sequence control unit; and
operation as the data output unit comprises operation to output data to the sequence control unit.

4. The device with extensibility according to claim 3, wherein the processor is configured such that:
operation as the basic configuration comprises operation as an image input unit configured to receive image data from a camera of an object to be inspected, and operation as an inspection result output unit configured to output an inspection result of the object to be inspected to an external device, and
operation as the data input unit comprises operation to import data from the image input unit based on a control signal from the sequence control unit.

5. The device with extensibility according to claim 4, wherein the processor is configured such that operation as the sequence control unit comprises operation that, in response to the sequence control unit receiving a detection signal that is output from a sensor for detecting the object to be inspected, outputs a control signal to the image input unit such that the image input unit holds the image data obtained after a predetermined time period.

6. The device with extensibility according to claim 3, wherein the processor is configured such that:
operation as the basic configuration comprises operation as a voice input unit configured to receive voice data from a user terminal, and operation as a result output unit configured to output a speaker identification result of the voice data to the user terminal, and operation as the data input unit comprises operation to import data from the voice input unit based on a control signal from the sequence control unit.

7. The device with extensibility according to claim 1, wherein the ability providing data comprises operation confirmation data, and the processor is configured such that operation as the ability setting unit comprises operation to confirm, using the operation confirmation data, whether the added new ability correctly operates, after the function is set for each of the ability unit, the data input unit, and the data output unit based on the ability providing data.

8. The device with extensibility according to claim 7, wherein the operation confirmation data comprises one or more pieces of input data and determination information for determining whether data, which is processed by the ability unit in response to the input data being received by the data input unit, is data to be output from the data output unit, and the processor is configured such that operation as the ability setting unit comprises operation to confirm, using the determination information, whether the added new ability correctly operates by determining data that is output from the data output unit, which is obtained by the input data being received by the data input unit.

9. The device with extensibility according to claim 1, wherein the ability setting data comprises data for setting, in the ability unit, a function of implementing the new ability, the input setting data comprises data for setting, in the data input unit, a function relating to an interface for an input into the ability unit, and the output setting data comprises data for setting, in the data output unit, a function relating to an interface for an output from the ability unit.

10. The device with extensibility according to claim 9, wherein the function relating to the interface for the input to the ability unit comprises at least one of a function of importing data from the basic configuration to the data input unit, a function of importing data from another device to the data input unit, a function of processing the imported data, and a function of converting a data format so as to be compatible with the ability unit.

11. The device with extensibility according to claim 9, wherein the function relating to the interface for the output from the ability unit comprises at least one of a function of processing the data that is output from the ability unit, a function of converting the data format so as to make it compatible with the basic configuration, and a function of converting the data format so as to be compatible with the other device.

12. The device with extensibility according to claim 1, wherein the processor comprises a rewritable electronic circuit, and the ability providing data comprises data that is written in the rewritable electronic circuit.

13. The device with extensibility according to claim 1, wherein the ability providing data comprises a program that is executed by the processor.

14. The device with extensibility according to claim 1, wherein the new ability is acquired through machine learning.

15. The device with extensibility according to claim 2, wherein the ability providing data comprises operation confirmation data, and the processor is configured with the program such that operation as the ability setting unit comprises operation as the ability setting unit configured to confirm, using the operation confirmation data, whether the new ability correctly operates, after the function is set for each of the ability unit, the data input unit, and the data output unit based on the ability providing data.

16. The device with extensibility according to claim 2 wherein the ability setting data comprises data for setting, in the ability unit, a function of implementing the new ability, the input setting data comprises data for setting, in the data input unit, a function relating to an interface for an input into the ability unit, and the output setting data comprises data for setting, in the data output unit, a function relating to an interface for an output from the ability unit.

17. The device with extensibility according to claim 2, wherein the processor is configured to perform operation such that operation as an architecture comprises operation as an architecture comprising a rewritable electronic circuit, and the ability providing data comprises data that is written in the rewritable electronic circuit.

18. The device with extensibility according to claim 2, wherein the ability providing data comprises a program that is executed by the processor.

19. The device with extensibility according to claim 2, wherein the new ability is acquired through machine learning.

* * * * *